(12) United States Patent
Akiba et al.

(10) Patent No.: US 6,377,745 B2
(45) Date of Patent: *Apr. 23, 2002

(54) RECORDING/REPRODUCING APPARATUS AND METHOD

(75) Inventors: Toshiya Akiba, Kanagawa; Masashi Ohta, Tokyo; Taro Suito, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,694

(22) Filed: Feb. 9, 1998

(30) Foreign Application Priority Data

Feb. 12, 1997 (JP) .............................. 9-027444

(51) Int. Cl.$^7$ .............................................. H04N 5/783
(52) U.S. Cl. ............................ 386/68; 386/95; 386/125
(58) Field of Search ............................ 386/46, 68, 83, 386/95, 96, 111, 112, 125, 102, 126; 348/906, 565

(56) References Cited

U.S. PATENT DOCUMENTS

| | | | | |
|---|---|---|---|---|
| 5,546,191 A | * | 8/1996 | Hibi et al. | 386/83 |
| 5,754,728 A | * | 5/1998 | Nakajima et al. | 386/68 |
| 5,784,518 A | * | 7/1998 | Ogura | 386/68 |
| 5,841,938 A | * | 11/1998 | Nitta et al. | 386/68 |
| 5,903,314 A | * | 5/1999 | Niijima et al. | 348/906 |
| 5,970,205 A | * | 10/1999 | Nakamura et al. | 386/68 |
| 5,987,212 A | * | 11/1999 | Kim et al. | 386/68 |
| 6,141,491 A | * | 10/2000 | Yamagishi et al. | 386/109 |

FOREIGN PATENT DOCUMENTS

| | | |
|---|---|---|
| EP | 0 401 930 | 12/1990 |
| EP | 0 731 469 | 9/1996 |
| EP | 0 737 978 | 10/1996 |
| WO | WO 98 34181 | 8/1998 |

OTHER PUBLICATIONS

Hanjalic A et al: "Automation of Systems Enabling Search on Stored Video Data" Proceedings of the Spie, Feb. 13, 1997, XP000742399.

Dimitrova N et al: "Video Keyframe Extraction and Filtering: A Keyframe is not a Keyframe to Everyone" Proceedings of the International Conference on Information and Knowledge Management. CIKM, US, New York, ACM, vol. Conf. 6, Nov. 10, 1997, pp. 113–120, XP000775302.

* cited by examiner

Primary Examiner—Huy Nguyen
(74) Attorney, Agent, or Firm—Fommer Lawrence & Haug LLP; William S. Frommer; Bruno Polito

(57) ABSTRACT

Images of reproduced video data of plural channels are displayed on main small screens arrayed in a central horizontal row on an index picture. Time-serially anterior images of reproduced video data are displayed on two upper small screens above the main small screens, while time-serially posterior images of reproduced video data are displayed on two lower small screens below the main small screens. In a forward reproduction mode, the images displayed on the respective small screens are altered, with a lapse of time, to the lower adjacent images while being cross faded. And in a reverse reproduction mode, the images are altered, with a lapse of time, to the upper adjacent images while being cross faded. A normal reproducing operation is started from a desired image when the main small screen, where the desired image is being displayed, is selected by means of a cursor. Thus, any image of video data can be indexed efficiently.

11 Claims, 20 Drawing Sheets

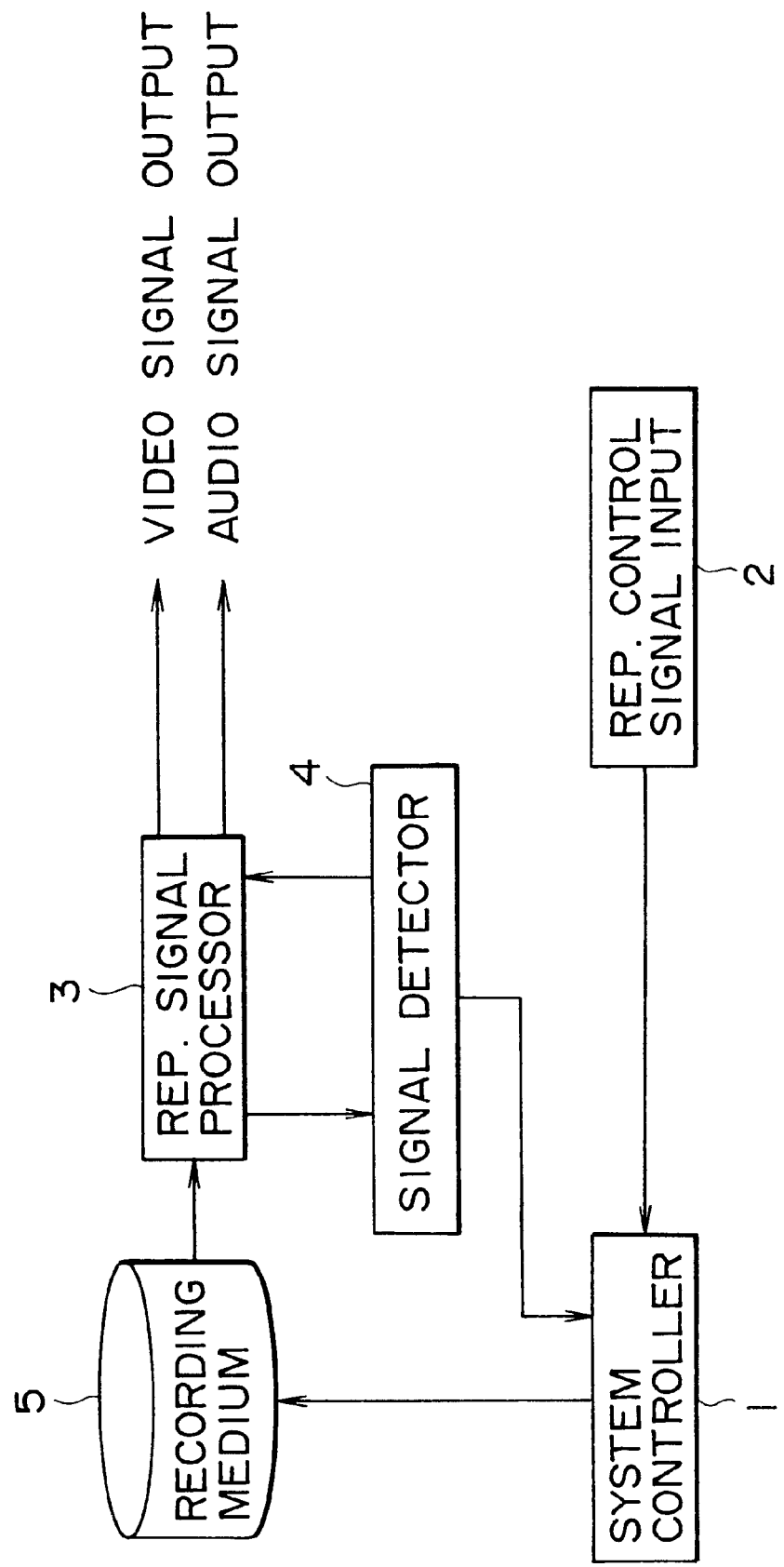

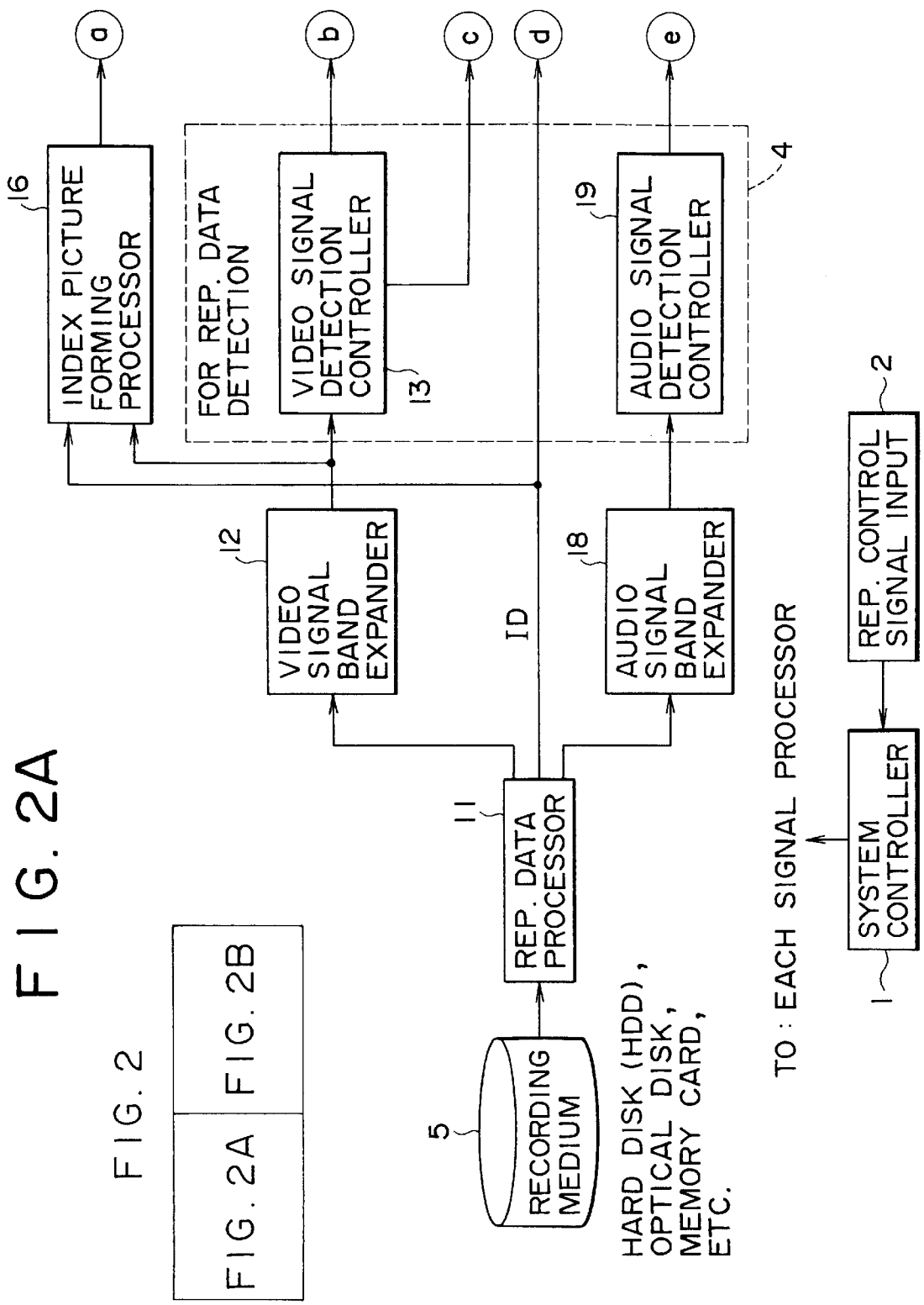

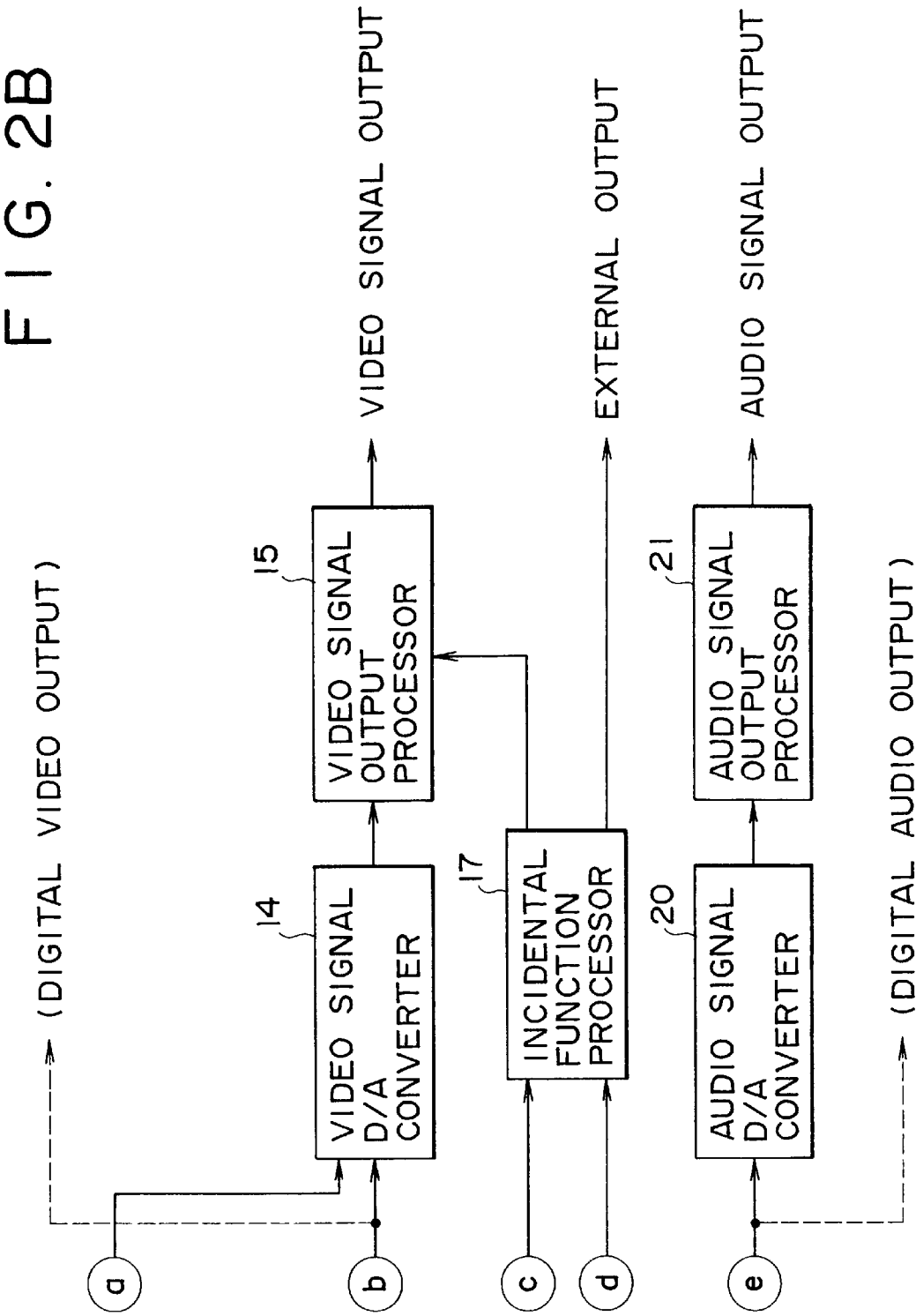

FIG. 3

| bit<br>byte | 7 | 6 | 5 | 4 | 3 | 2 | 1 | 0 |
|---|---|---|---|---|---|---|---|---|
| 0 | \multicolumn{4}{c}{RECORDING TIME YEAR} | | | | | |
| | | | | | | | | |

| bit / byte | 7 6 5 4 | 3 2 1 0 |
|---|---|---|
| 0 | RECORDING TIME YEAR | YEAR |
| 1 | MONTH | MONTH |
| 2 | DAY | DAY |
| 3 | HOUR | HOUR |
| 4 | MINUTE | MINUTE |
| 5 | SECOND | SECOND |
| 6 | INPUT SOURCE | |
| 7 | CHANNEL | CHANNEL |
| 8 | ID CATEGORY | |
| 9 | VIDEO KIND | (ex. CM) |
| 10 | RESERVED | |
| 11 | RESERVED | |
| 12 | RESERVED | |
| 13 | RESERVED | |
| 14 | RESERVED | |
| 15 | RESERVED | |

FIG. 4A

| VIDEO | AUDIO | VIDEO | AUDIO |

| ID | ID | ID | ID |

VIDEO AND AUDIO DATA OF ONE FRAME ARE RECORDED AS ONE BLOCK UNIT, AND CORRESPONDING ID IS RECORDED IN OTHER AREA OF RECORDING MEDIUM.

FIG. 4B

| VIDEO | AUDIO | ID | VIDEO | AUDIO | ID |

VIDEO, AUDIO DATA AND ID OF ONE FRAME ARE RECORDED AS ONE BLOCK UNIT IN RECORDING MEDIUM.

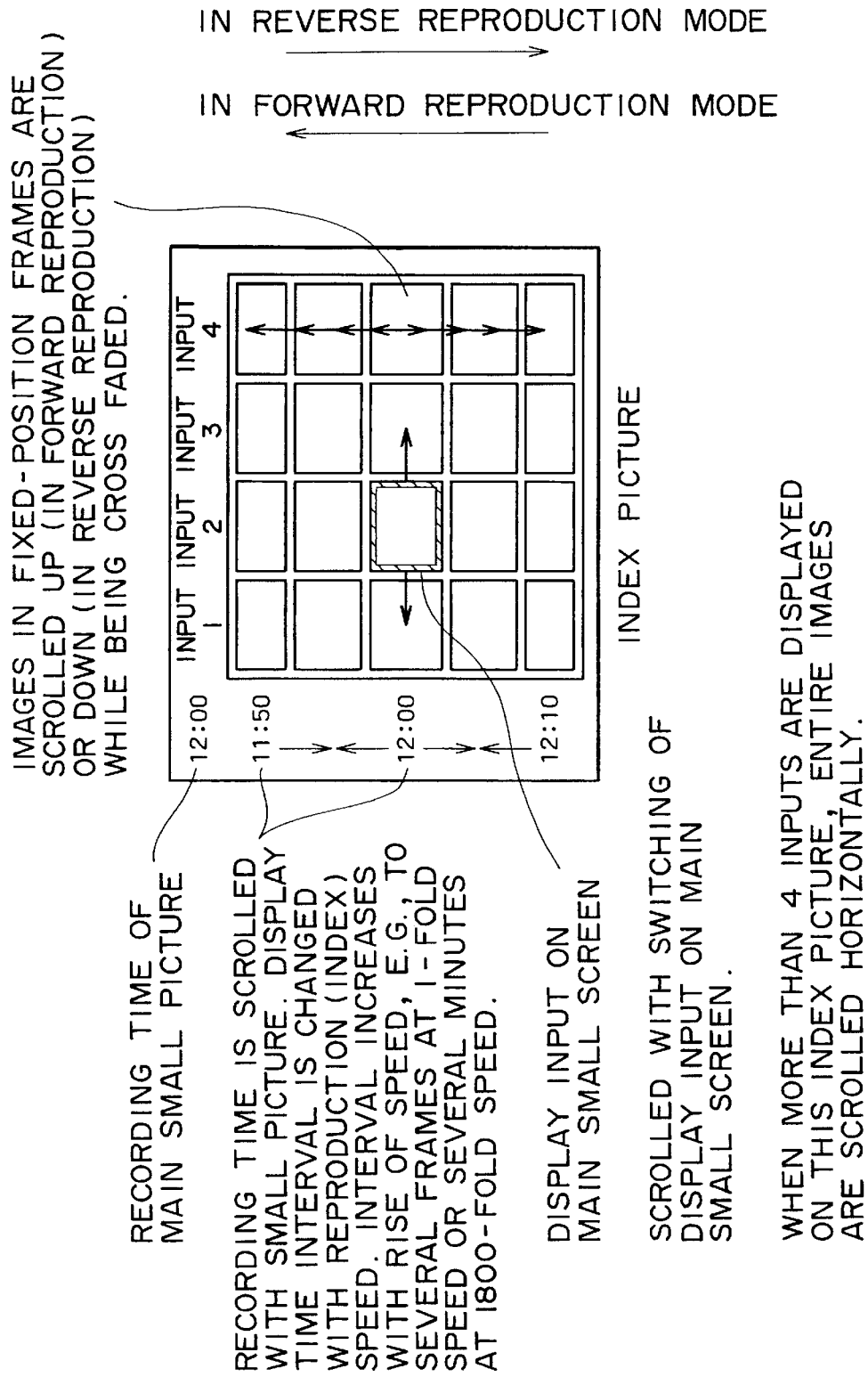

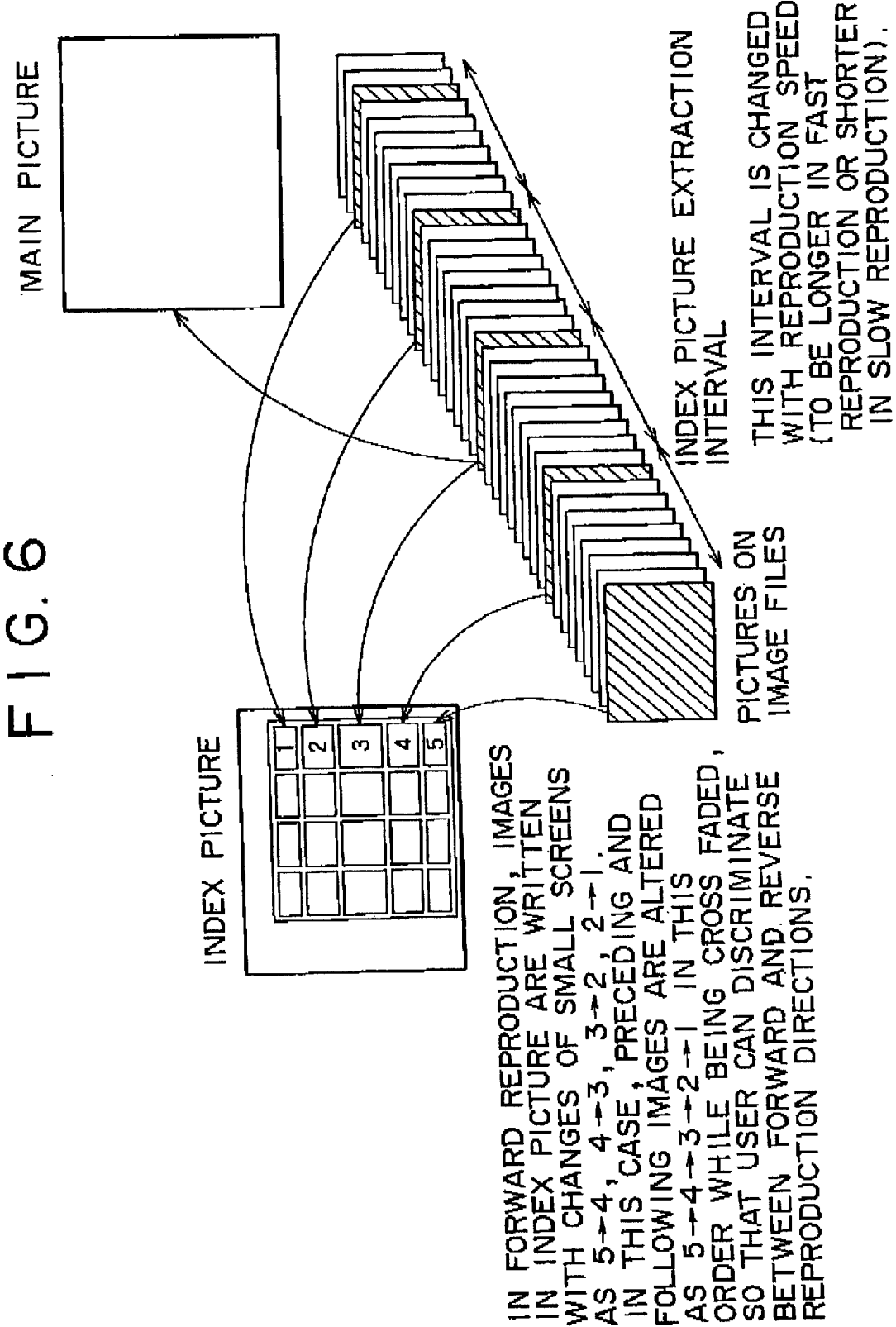

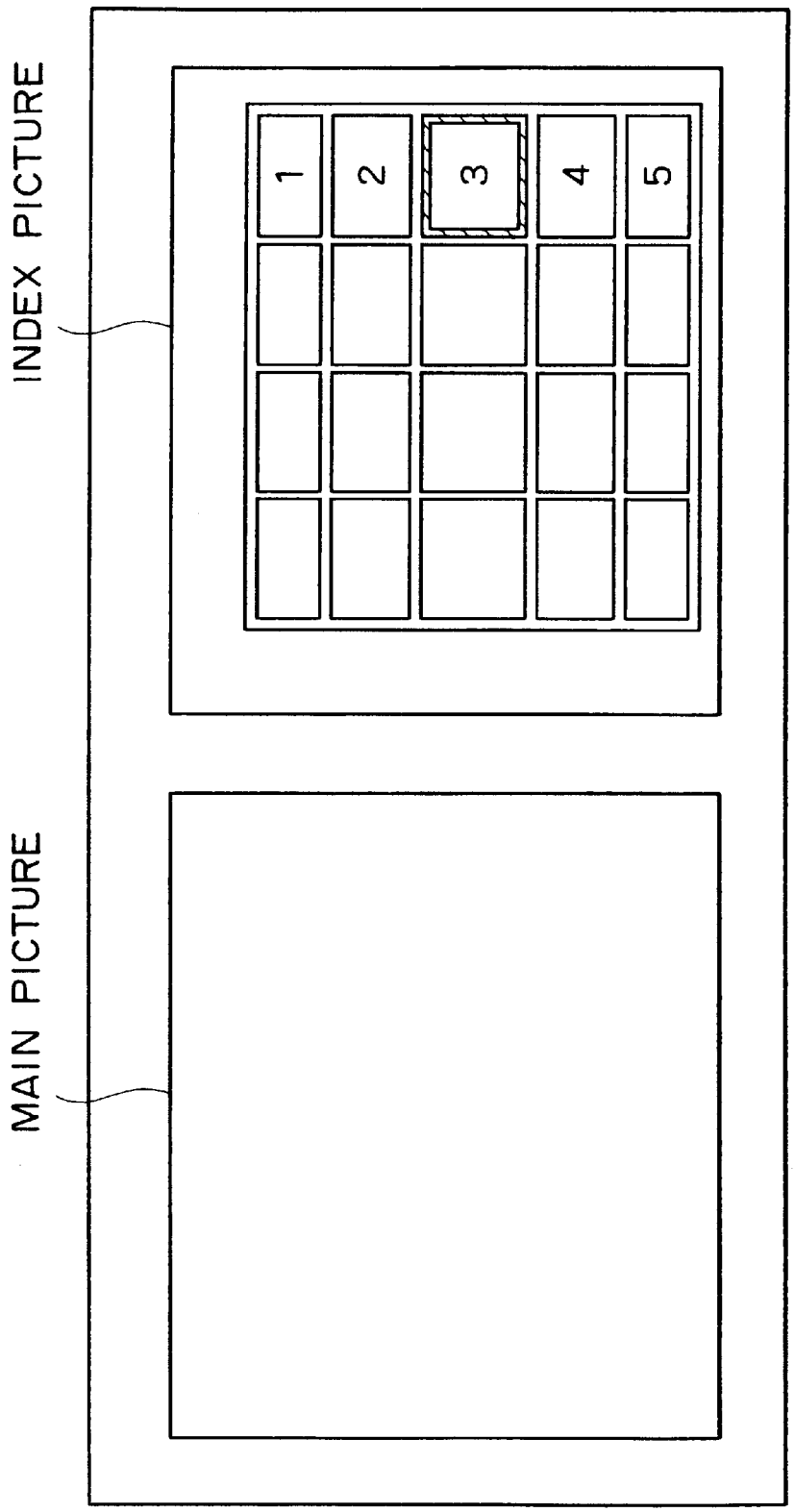

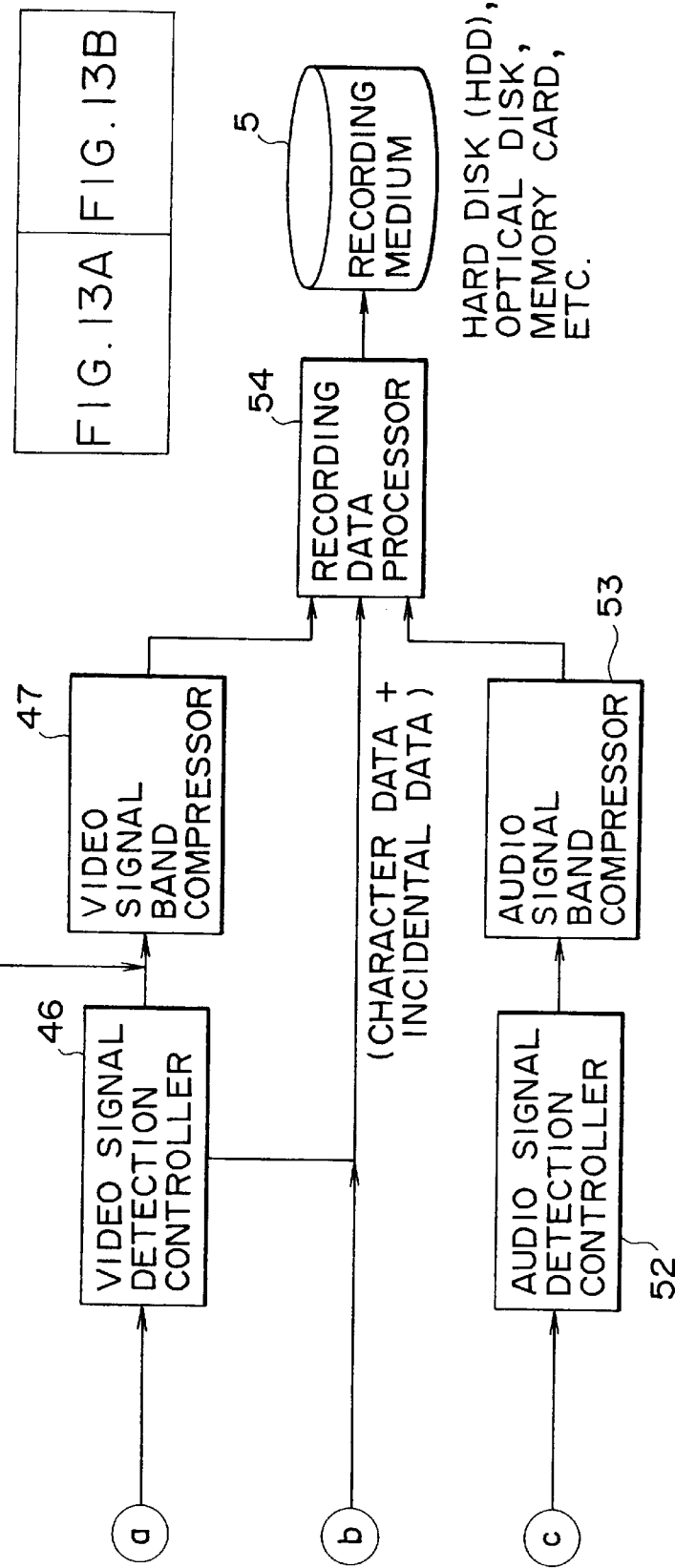

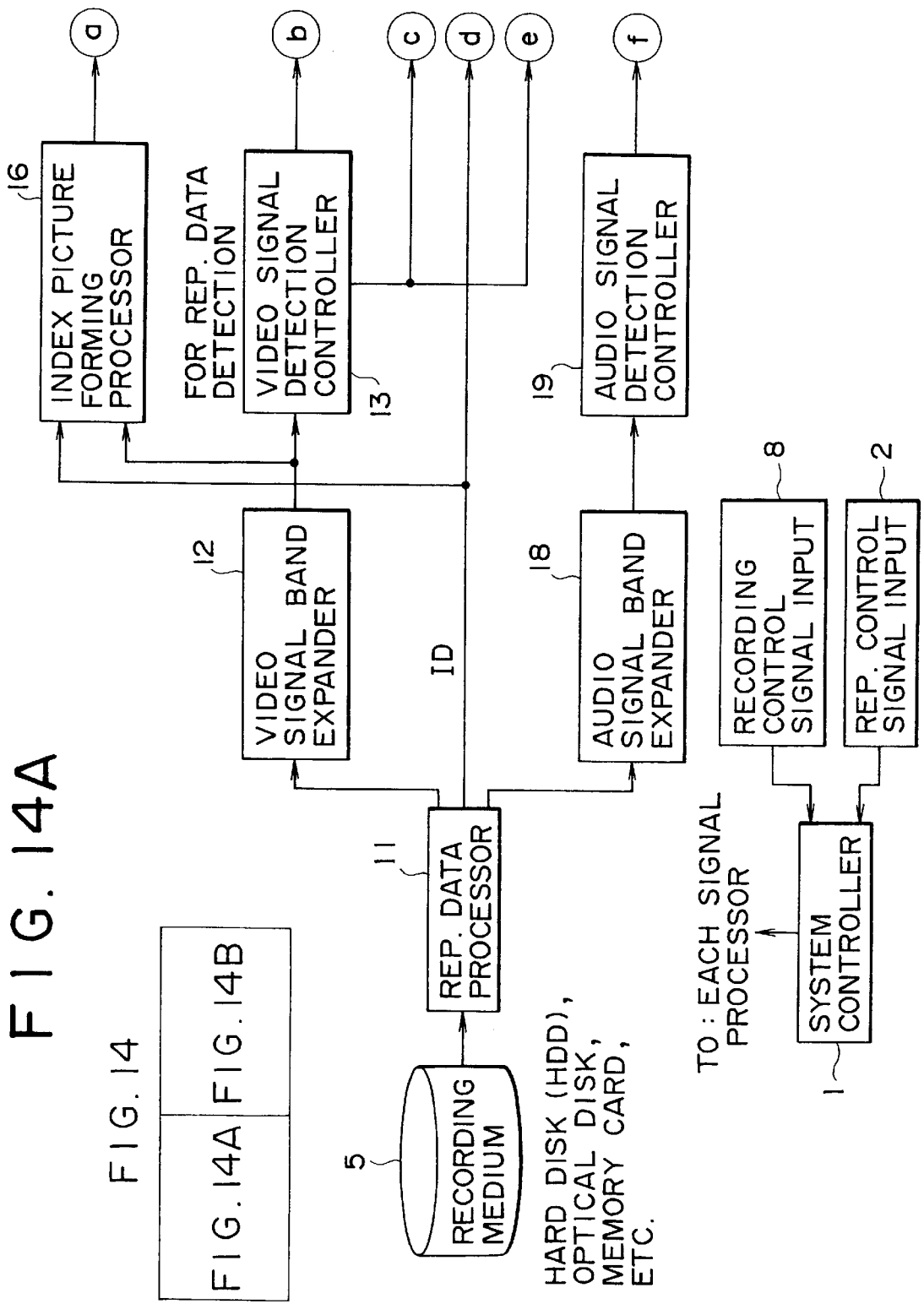

RECORDING/REPRODUCING APPARATUS AND METHOD

BACKGROUND OF THE INVENTION

The present invention relates to a recording/reproducing apparatus and a method thereof, and more particularly to an apparatus and a method which, when reproducing a plurality of video and audio signals simultaneously from a recording medium, are capable of displaying, in reduced dimensions, reproduced images of the video signals together with the video signals anterior and posterior in time thereto, hence enabling a user to rapidly grasp the recorded contents in the recording medium.

In retrieving video data of a plurality of channels recorded in a recording medium, there is contrived a technique that divides an index screen into a plurality of small screens arranged in the form of a lattice and displays, in such small screens respectively, the reproduced images obtained through digested reproduction which reads out the video data at a predetermined interval. According to this technique, the data can be retrieved by searching a desired location of a predetermined channel in a cue (fast forward) reproduction mode or a review (rewind) reproduction mode.

However, there has been a problem in such related art heretofore that, when the fast reproduced images are displayed on the small screens in a lattice-like arrangement, the temporal relationship among the images is not graspable with facility to consequently bring about difficulty in searching the desired location.

Further, the reproduced images displayed on small screens need to be enlarged, at the time of display, after being read out through access to the recording medium, hence raising another problem that the load is rendered greater in proportion to an increase of the number of such small screens.

SUMMARY OF THE INVENTION

It is therefore an object of the present invention to realize rapid and easy search of a desired location relative to video data of a plurality of channels recorded in a recording medium.

According to a first aspect of the present invention, there is provided a recording/reproducing apparatus as defined in the appended claim 1 which comprises read means for reading out video data; designation means for selectively designating a reproduction speed; and control means for controlling, in accordance with the reproduction speed designated by the designation means, the interval at which the read means reads out the video data.

According to a second aspect of the invention, there is provided a recording/reproducing apparatus as defined in the appended claim 3 which comprises read means for reading out video data successively at a predetermined interval; reduced display control means for executing, on a predetermined screen, simultaneous time-series display of reduced images obtained by dimensionally reducing the images which correspond to a predetermined number of video data read out by the read means; and alteration means for gradually altering, in a forward reproduction mode, each reduced image to the time-serially posterior reduced image, or gradually altering, in a reverse reproduction mode, each reduced image to the time-serially anterior reduced image.

According to a third aspect of the invention, there is provided a recording/reproducing apparatus as defined in the appended claim 4 which comprises designation means for selectively designating a reproduction speed; first read means for successively reading out video data at a predetermined read interval; decision means for deciding, in accordance with the reproduction speed designated by the designation means, the interval at which the first read means reads out the video data; second read means for reading out incidental data indicative of the kind of the video data; and change means for changing the video data reading interval of the first read means on the basis of the incidental data read out by the second read means and the reading interval corresponding to the reproduction speed decided by the decision means.

According to a fourth aspect of the invention, there is provided a recording/reproducing apparatus as defined in the appended claim 6 which comprises read means for reading out, at a predetermined interval, video data recorded in a recording medium; reduction means for dimensionally reducing images corresponding to the video data read out by the read means; display control means for displaying the reduced images, which are obtained from the reduction means, on a plurality of small screens set on a predetermined screen; and storage means prepared equally in number to such small screens so as to store the video data corresponding to the reduced images to be displayed respectively on the small screens. In this apparatus, when the video data corresponding to the next reduced images to be displayed on the relevant small screens are stored in the storage means, the display control means displays the reduced images, which correspond to the video data stored in the storage means and are to be displayed next, on the relevant small screens respectively.

According to a fifth aspect of the invention, there is provided a recording/reproducing method as defined in the appended claim 9 which comprises the steps of reading out video data; then designating a data reproduction speed selectively; and controlling a video-data reading interval in accordance with the designated reproduction speed.

According to a sixth aspect of the invention, there is provided a recording/reproducing method as defined in the appended claim 9 which comprises the steps of reading out video data at a predetermined interval; then executing, on a predetermined screen, simultaneous time-series display of reduced images obtained by dimensionally reducing images which correspond to a predetermined number of video data read out by the read means; and gradually altering, in a forward reproduction mode, each reduced image to the time-serially posterior reduced image, or gradually altering, in a reverse reproduction mode, each reduced image to the time-serially anterior reduced image.

According to a seventh aspect of the invention, there is provided a recording/reproducing method as defined in the appended claim 10 which comprises the steps of selectively designating a reproduction speed; then successively reading out video data at a predetermined read interval; subsequently deciding the video-data reading interval in accordance with the designated reproduction speed; thereafter reading out incidental data indicative of the kind of the video data; and changing the video-data reading interval on the basis of the incidental data thus read out and the reading interval corresponding to the decided reproduction speed.

And according to an eighth aspect of the invention, there is provided a recording/reproducing method as defined in the appended claim 11 which comprises the steps of reading out, at a predetermined interval, video data recorded in a recording medium; then dimensionally reducing images corresponding to the video data thus read out; subsequently displaying the reduced images on a plurality of small screens set on a predetermined screen; thereafter storing the video data corresponding to the reduced images to be displayed respectively on the small screens and, when the video data corresponding to the next reduced images to be displayed on the relevant small screens are stored, displaying the reduced images, which correspond to the stored video data to be displayed next, on the relevant small screens respectively.

In the recording/reproducing apparatus of the appended claim 1, the read means reads out the video data, and the designation means selectively designates a reproduction speed. And subsequently the control means controls, in accordance with the reproduction speed designated by the designation means, the interval at which the read means reads out the video data.

In the recording/reproducing apparatus of the appended claim 3, the read means reads out the video data successively at a predetermined interval, and the reduced display control means executes, on a predetermined screen, simultaneous time-series display of the reduced images obtained by dimensionally reducing the images which correspond to a predetermined number of video data read out by the read means. And the alteration means gradually alters, in a forward reproduction mode, each reduced image to the time-serially posterior reduced image, or gradually alters, in a reverse reproduction mode, each reduced image to the time-serially anterior reduced image.

In the recording/reproducing apparatus of the appended claim 4, the designation means selectively designates a reproduction speed, and the first read means successively reads out video data at a predetermined read interval. Subsequently the decision means decides, in accordance with the reproduction speed designated by the designation means, the interval at which the first read means reads out the video data, and the second read means reads out incidental data indicative of the kind of the video data. And thereafter the change means changes the video data reading interval of the first read means on the basis of the incidental data read out the second read means and the reading interval corresponding to the reproduction speed decided by the decision means.

In the recording/reproducing apparatus of the appended claim 6, the read means reads out, at a predetermined interval, the video data recorded on a recording medium, and the reduction means dimensionally reduces the images corresponding to the video data read out by the read means. Subsequently the display control means displays the reduced images, which are obtained from the reduction means, on a plurality of small screens set on a predetermined screen, and the storage means prepared equally in number to such small screens store the video data corresponding to the reduced images to be displayed respectively on the small screens. In this apparatus, when the video data corresponding to the next reduced images to be displayed on the relevant small screens are stored in the storage means, the display control means displays the reduced images, which correspond to the video data stored in the storage means and are to be displayed next, on the relevant small screens respectively.

In the recording/reproducing method of the appended claim 9, when video data are read out, the video data reading interval is controlled in accordance with the designated reproduction speed.

In the recording/reproducing method of the appended claim 9, video data are read out successively at a predetermined interval, and then simultaneous time-series display is executed, on a predetermined screen, with regard to reduced images obtained by dimensionally reducing the images which correspond to a predetermined number of the video data read out by the read means. And in a forward reproduction mode, each reduced image is gradually altered to the time-serially posterior reduced image. Meanwhile in a reverse reproduction mode, each reduced image is gradually altered to the time-serially anterior reduced image.

In the recording/reproducing method of the appended claim 10, a reproduction speed is selectively designated, and then video data are read out successively at a predetermined read interval. Subsequently the video-data reading interval is decided in accordance with the designated reproduction speed, and thereafter incidental data indicative of the kind of the video data is read out. And the video data reading interval is changed on the basis of the incidental data thus read out and the reading interval corresponding to the decided reproduction speed.

And in the recording/reproducing method of the appended claim 11, video data recorded in a recording medium are read out at a predetermined interval, and then images corresponding to the video data thus read out are dimensionally reduced. Subsequently the reduced images are displayed on a plurality of small screens set on a predetermined screen, and the video data corresponding to the reduced images to be displayed respectively on the relevant small screens are stored. And when the video data corresponding to the next reduced images to be displayed on the small screens are stored, the reduced images, which are to be displayed next and correspond to the stored video data, are displayed on the relevant small screens respectively.

Thus, according to the apparatus and the method of the present invention where the data reading interval is controlled in conformity with the designated reproduction speed, the reproduction interval can be changed properly to thereby suppress the user's eye strain with efficient retrieval of the video data.

Also according to the apparatus and the method of the invention where the video data are read out successively at a predetermined interval, simultaneous time-series display is executed, on a predetermined screen, with regard to reduced images obtained by dimensionally reducing the images which correspond to a predetermined number of the video data read out by the read means. And in a forward reproduction mode, each reduced image is gradually altered to the time-serially posterior reduced image, while in a reverse reproduction mode, each reduced image is gradually altered to the time-serially anterior reduced image. As a result, easy retrieval of desired video data is achievable on the basis of the positional relationship to the anterior and posterior video data.

Further according to the apparatus and the method of the invention where a reproduction speed is selectively designated and the video data are read out successively at a predetermined read interval, the video data reading interval is decided in accordance with the designated reproduction speed, and thereafter incidental data indicative of the kind of the video data is read out. And the video data reading interval is changed on the basis of the incidental data thus read out and the reading interval corresponding to the decided reproduction speed. Therefore, it becomes possible to eliminate display of any unnecessary image such as a commercial to consequently realize efficient retrieval of desired video data.

And still further according to the apparatus and the method of the invention where video data recorded in a recording medium are read out at a predetermined interval and the images corresponding to the video data thus read out are dimensionally reduced, the reduced images are displayed on a plurality of small screens set on a predetermined screen, and subsequently the video data corresponding to the reduced images to be displayed respectively on the relevant small screens are stored. And when the video data corresponding to the next reduced images to be displayed on the small screens are stored, the reduced images, which are to be displayed next and correspond to the stored video data, are displayed on the relevant small screens respectively, whereby required accesses to the recording medium can be minimized to eventually enhance the response.

The above and other features and advantages of the present invention will become apparent from the following description which will be given with reference to the illustrative accompanying drawings.

BRIEF DESCRIPTION OF THE DRAWINGS

FIG. 1 is a block diagram of an exemplary embodiment representing a video-audio reproducing apparatus where the recording/reproducing apparatus of the present invention is applied;

FIG. 2 is a block diagram showing a detailed structural example of FIG. 1;

FIG. 3 shows an ID format;

FIGS. 4A and 4B show data recording formats;

FIG. 5 shows an exemplary index picture;

FIG. 6 illustrates a procedure of forming an index picture;

FIG. 7 shows how a main picture and an index picture are displayed simultaneously;

DESCRIPTION OF THE PREFERRED EMBODIMENTS

Figure 8:
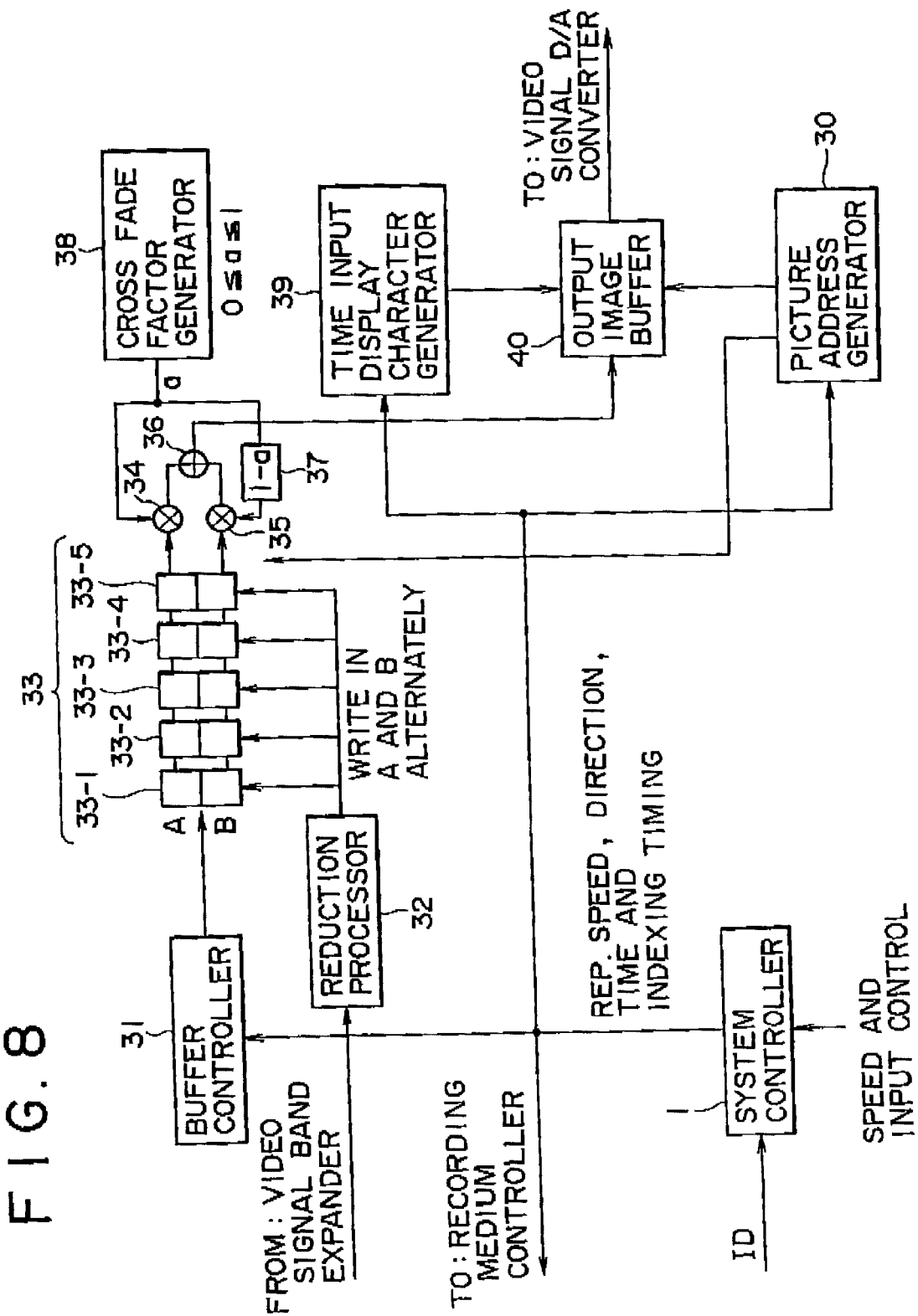
FIG. 8 is a block diagram showing a structural example of an index picture forming processor.

FIG. 1 is a block diagram of an exemplary embodiment representing a video-audio reproducing apparatus where the recording/reproducing apparatus of the present invention is applied. A reproduction control signal input unit 2 (designation means) consists of a keyboard, a mouse or the like used for inputting a command to control an operation in a reproduction mode. A system controller 1 (control means, decision means, change means) serves to control each of component units in response to a reproduction control signal corresponding to the command supplied from the reproduction control signal input unit 2.

A recording medium 5 is used for storing video data, audio data and ID (incidental data) relative to such data, wherein the data are reproduced and outputted under control of the system controller 1. A reproduced signal processor 3 is used for separating the data, which are reproduced from the recording medium 5, into video data, audio data and incidental data. An index picture (retrieval picture) is formed on the basis of the reproduced data, and then video signals corresponding thereto are outputted. A signal detector 4 generates ID (incidental data) from the reproduced signal supplied from the reproduced signal processor 3, and then outputs the ID therefrom.

FIG. 2 is a block diagram showing a detailed structural example of the video-audio recording/reproducing apparatus in FIG. 1. A reproduced data processor 11 (read means, first read means, second read means) is used for reproducing the data recorded in the recording medium 5, and separating the reproduced data into video data, audio data and incidental data. A video signal band expander 12 expands the video data compressed in accordance with the MPEG (Moving Picture Experts Group) standard or the like and supplied from the reproduced data processor 11. And an index picture former 16 (reduced display control means) has a plurality of buffers and serves to form an index picture on the basis of the video data supplied from the video signal band expander 12.

A video signal detection controller 13 generates incidental data on the basis of the video data supplied from the video signal band expander 12 and then outputs the incidental data. A video signal D/A converter 14 converts the video data, which are supplied from the index picture former 16 and the video signal detection controller 13, into analog video signals and then outputs the same. An incidental function processor 17 outputs the incidental data (ID) supplied from the video signal detection controller 13 or the reproduced data processor 11.

A video signal output processor 15 superimposes the ID, which is supplied from the incidental function processor 17, on the video signal supplied from the video signal D/A converter 14, and then outputs the resultant signal. An audio signal band expander 18 expands the audio data compressed in accordance with the MPEG standard or the like and supplied from the reproduced data processor 11. And an audio signal detection controller 19 executes a process of noise component elimination and so forth with regard to the audio data supplied from the audio signal band expander 18.

An audio signal D/A converter 20 converts the audio data, which are supplied from the audio signal detection controller 19, into analog audio signal. And an audio signal output processor 21 encodes the input audio signal and then outputs the encoded signal.

Now the operation performed in the above apparatus will be described below. Upon reception of a command from the reproduction control signal input unit 2 to indicate digest reproduction and a reproduction speed relative to the data recorded in the recording medium 5, the system controller 1 instructs the reproduced data processor 11 to execute digest reproduction of the data recorded in the recording medium 5. Then, in response to the instruction from the system controller 1, the reproduced data processor 11 performs reproduction of the data recorded in the recording medium 5, at the designated reproduction speed. More specifically, the data processor 11 reads out the recorded data from the recording medium 5 at a predetermined interval corresponding to the reproduction speed.

The reproduced data obtained from the recording medium 5 are separated into video data, audio data and incidental data in the reproduced data processor 11. Subsequently the video data is supplied to the video signal band expander 12 while the audio data is supplied to the audio signal band expander 18, and the incidental data is supplied to the incidental function processor 17.

FIG. 3 shows an exemplary format of the incidental data. In this example, the incidental data is composed of 16 bytes representing the data relative to a recording time which includes year, month, day, hour, minute and second, and also to an input source, a channel No., an ID category and a video kind such as commercial message (CM). Bytes 10 to 15 are reserved for future use.

The video data, the audio data and the ID are recorded on the medium 5 in the recording format of FIG. 4A or 4B. In the case of FIG. 4A, the video data and the audio data of each frame are recorded as one unit block, and the individual blocks are recorded in predetermined areas which are continuous physically or logically on the recording medium 5. And the ID corresponding to such blocks are recorded in other predetermined areas continuous logically or physically. In another case of FIG. 4B, the video data, the audio data and the ID of each frame are recorded as one unit block, and the individual blocks are recorded in predetermined areas which are continuous logically or physically on the recording medium 5.

In the video signal band expander 12, the video data compressed in accordance with the MPEG standard or the like and supplied from the reproduced data processor 11 are expanded and then are supplied to both the index picture former 16 and the video signal detection controller 13. Subsequently in the index picture former 16, the video data supplied from the video signal band expander 12 are processed to be reduced and then are written in internal buffers. The video data corresponding to the reduced images written in the buffers are supplied to the video signal D/A converter 14, where the video data are converted into analog video signal and are thereafter supplied to the video signal output processor 15.

In the video signal detection controller 13, incidental data relative to the video data supplied from the video signal band expander 12 is generated and then is supplied to the incidental function processor 17. Subsequently the incidental data obtained from the reproduced data processor 11 and processed in the incidental function processor 17, or the incidental data outputted from the video signal detection controller 13, is supplied to the video signal output processor 15. Such incidental data can be supplied also to any external connected apparatus as well.

The incidental data is superimposed on the video signal supplied to the video signal output processor 15 and, after being encoded, the encoded signal is supplied to a predetermined display device so that an index picture is displayed thereon as will be described later with reference to FIG. 5.

Meanwhile the audio data compressed in accordance with the MPEG standard or the like and supplied to the audio signal band expander 18 is expanded and then is supplied to the audio signal detection controller 19. Next, a noise component reduction process and so forth are executed in the audio signal detection controller 19 with regard to the audio data supplied from the audio signal band expander 18, and thereafter the data thus processed are supplied to the audio signal D/A converter 20. Subsequently in the audio signal D/A converter 20, the audio data supplied from the audio signal detection controller 19 is converted into analog audio signal and then is supplied to the audio signal output processor 21.

In the audio signal output processor 21, the audio signal supplied from the audio signal D/A converter 20 is encoded and then is outputted.

FIG. 5 shows an example of a displayed index picture. In this example, main small screens are arranged at the center for four inputs, and two subsidiary small screens are arranged before and after (above and below in FIG. 5) each of the main small screens respectively. And time-serially anterior images are displayed on the subsidiary small screens arranged above the main small screen, while time-serially posterior images are displayed on the subsidiary small screens arranged below the main small screen.

The broadcasting time, at which the images displayed on the main small screens are recorded, is displayed in an upper left portion of the index picture, and the recording time corresponding to the images being displayed in the small screens is displayed in a lower portion thereof. In this example, time 11:50 is displayed correspondingly to the uppermost subsidiary small screens, and time 12:00 is displayed correspondingly to the main small screens, and further time 12:10 is displayed correspondingly to the lowermost subsidiary small screens.

The display position of each small screen is fixed, and the image therein is scrolled upward or downward while being cross faded. For example, in a forward reproduction mode, the recording time is scrolled upward with a lapse of time. And the image displayed in each small screen is altered, while being cross faded, to the next image being displayed in the lower small screen. Seemingly, therefore, the image displayed in each small screen is scrolled to the upper small screen. And the image displayed in the lowermost small screen is altered to the next image while being cross faded with the next image positioned virtually therebelow.

To the contrary, in a reverse reproduction mode, the recording time is scrolled downward with a lapse of time. And the image displayed in each small screen is altered, while being cross faded, to the next image being displayed in the upper small screen. Seemingly, therefore, the image displayed in each small screen is scrolled to the lower small screen. And the image displayed in the uppermost small screen is altered to the next image while being cross faded with the next image positioned virtually thereabove.

The interval between the recording times displayed on the left of the index picture shown in FIG. 5 is changed in proportion to the reproduction speed. For example, at a 1-fold reproduction speed, the recording time interval is changed to a time length corresponding to reproduction of several frames. Meanwhile at a 1800-fold reproduction speed, the recording time interval is changed to several minutes. The reason grounds on that the interval of frames to be read out is changed in proportion to the reproduction speed, as will be described later with reference to FIG. 6. For example, in reproduction at a 1800-fold speed, the interval becomes longer than the time required for reproducing, at a 1-fold speed, the frames which are reproduced at a 1800-fold speed during the time (e.g., 0.2 second) required for the image in each small screen to cross fade with the image to be displayed next. (The interval in this example becomes 6 minutes (=0.2×1800/60).

On the index picture of FIG. 5, a thick-line rectangular cursor displayed on one main small screen is movable to the left or right main small screen by manipulating a mouse or the like which constitutes the reproduction control signal input unit 2. Therefore, any main small screen corresponding to a desired input can be selected by manipulating the mouse or the like. In case there are more than four inputs, an image corresponding to a fifth or subsequent input can be displayed in any small screen which corresponds to the fourth input (input 4), by moving leftward each image on the small screen through manipulation of the reproduction control signal input unit 2.

FIG. 6 illustrates a procedure to read out the recorded video data from the recording medium 5 when forming an index picture shown in FIG. 5. An image file for storage of video data is composed of a plurality of frames, and the frames to be read out of the entire frames are expressed in black. The interval of frames to be read out from the recording medium 5 is changeable in proportion to the reproduction speed. For example, the frame interval is changed to be long in a fast reproduction mode, or to be short in a slow reproduction mode.

The black frames in this drawing are displayed on the first to fifth small screens (small screens 1 to 5) of the index picture in this order. In a forward reproduction mode, the frame displayed on the fifth small screen is displayed next on the fourth small screen. And then the following frame is displayed on the fifth small screen. Similarly, the frame displayed on the fourth small screen is displayed next on the third small screen, and the frame displayed on the third small screen is displayed next on the second small screen. And the frame displayed on the second small screen is displayed next on the first small screen.

In this manner, the images displayed on the individual small screens are scrolled upward successively in this example. As will be described later with reference to FIG. 8, a cross fading process is executed when the frame displayed on each small screen is altered to the next frame, so that the preceding frame displayed before such alteration is gradually altered to the following frame.

The third small screen is a main one, and when this small screen is selected by a rectangular cursor, the frame being displayed thereon is displayed as a main picture on the display device.

FIG. 7 shows how a main picture and an index picture are displayed simultaneously on the displayed device. As illustrated, the main picture is displayed on the left side of the display device, while the index picture shown in FIG. 5 is displayed on the right side thereof. For example, when the user moves the cursor on the index picture on the display device by manipulating the reproduction control signal input unit 2, the image displayed as the main picture is also changed correspondingly thereto so that the image displayed as the main picture is switched to the image being displayed on the main small screen indicated by the cursor.

FIG. 8 is a block diagram showing a structural example of the index picture forming processor 16 in FIG. 2. A buffer controller 31 serves to control the input/output operation of a cross-fade image forming buffer 33 (alteration means) under control of the system controller 1. A reduction processor 32 reduces the video data supplied thereto from the video signal band expander 12. The cross-fade image forming buffer 33 consists of a plurality of paired frame buffers which are equal in number to input (display) channels and store the reduced video data of the respective channels supplied from the reduction processor 32.

In the case of this example, the cross-fade image forming buffer 33 consists of frame buffers 33-1-A to 33-5-A and frame buffers 33-1-B to 33-5-B corresponding to five channels. In the following description, the frame buffers 33-1-A to 33-5-A will be referred to simply as frame buffers A, unless otherwise specified. Similarly, the frame buffers 33-1-B to 33-5-B will be referred to simply as frame buffers B, unless otherwise specified.

A cross-fade factor generator 38 (alteration means) generates and outputs a cross fade coefficient a. A multiplier 34 multiplies each pixel of the video data supplied from the cross-fade image forming buffers 33-1-A–33-5-A, by the coefficient $\underline{a}$ ($0 \leq a \leq 1$) supplied from the cross fade factor generator 38. A calculator 37 subtracts from 1 the coefficient a obtained from the cross fade factor generator 38, and then supplies the result (1−a) as a coefficient to a multiplier 35.

The multiplier 35 multiplies each pixel of the video data supplied from the cross-fade image forming buffers 33-1-B–33-5-B, by the coefficient (1−a) supplied from the calculator 37.

An adder 36 adds, per pixel, the video data supplied from the multiplier 34 and the video data supplied from the multiplier 35, and then outputs the result of such addition. A time input display character generator 39 generates and outputs display data, which represent a recording time and other characters to be displayed on the index picture, under control of the system controller 1. An output image buffer (output buffer) 40 stores the cross-faded video data obtained from the adder 36, then superimposes thereon the display data which are supplied from the time input display character generator 39 and represent the time and other characters, and outputs the result of such superimposition.

A picture address generator 30 generates, under control of the system controller 1, addresses on an index picture where the video data stored in the cross-fade image forming buffers 33 are to be displayed, and then supplies the addresses to the output image buffer 40.

Hereinafter the operation thereof will be described. First, a desired reproduction mode indicating a speed and a direction of reproduction is inputted by a user through manipulation of the reproduction control signal input unit 2, and then is supplied to the system controller 1. Subsequently the system controller 1 instructs the reproduction data processor 11 to perform reproduction of data in accordance with the input reproduction mode. As a result, the recorded data are reproduced from the recording medium 5, and the ID included in the reproduced data obtained from the recording medium 5 by the reproduction data processor 11 is supplied to the system controller 1. Thus, the system controller 1 can recognize, on the basis of such ID, the input channel corresponding to the reproduced video data and also its kind (e.g., commercial message (CM)).

The video data outputted from the video signal band expander 12 are supplied to the reduction processor 32. Subsequently the video data supplied to the reproduction processor 32 are reduced respectively in conformity with the dimensions of the individual small screens relative to the index picture. And under control of the buffer controller 31, the video data thus reduced are supplied respectively to the relevant cross-fade image forming buffers 33. More specifically, the buffer controller 31 controls the cross-fade image forming buffer 33 under control of the system controller 1 in such a manner that the video data of one frame outputted from the reduction processor 32 are alternately supplied to and stored in the two frame buffers A and B of the cross-fade image forming buffer 33 corresponding to the input channel of the video data.

Similarly, the reduced image data corresponding to the other input channel are supplied to and stored in the relevant frame buffers of the cross-fade image forming buffer 33.

The video data thus stored in the frame buffers A of the cross-fade image forming buffer 33 are supplied successively to the multiplier 34, while the video data stored in the frame buffers B thereof are supplied successively to the multiplier 35. The video data supplied from the frame buffers A to the multiplier 34 are multiplied by the coefficient a supplied from the cross fade factor generator 38 and then are supplied to the adder 36. Meanwhile the video data supplied from the frame buffers B to the multiplier 35 are multiplied by the coefficient (1−a) supplied from the calculator 37 and then are supplied to the adder 36. That is, the coefficient a is supplied from the cross fade factor generator 38 to the calculator 37, where the coefficient (1−a) is calculated, and then this coefficient is supplied to the multiplier 35.

In this embodiment, the coefficient a is changeable to any value ranging from 0 to 1, and the image in the buffer B can be gradually altered to the image in the buffer A by increasing its value from, for example, 0 to 1 at an interval of 0.1. On the contrary, the image in the buffer A can be gradually altered to the image in the buffer B by decreasing the coefficient a from, for example, 1 to 0 at an interval of 0.1.

The result of multiplication obtained from the multiplier 34 and that from the multiplier 35 are added in the adder 36, and the result of such addition is supplied to the output image buffer 40. The image data, which are supplied to the output image buffer 40 and correspond to predetermined small screens, are stored in the relevant addresses of the output image buffer 40 in response to the address signals supplied from the picture address generator 30 under control of the system controller 1. Consequently, the small screens constituting the index picture are displayed as shown in FIG. 5.

Figure 9:
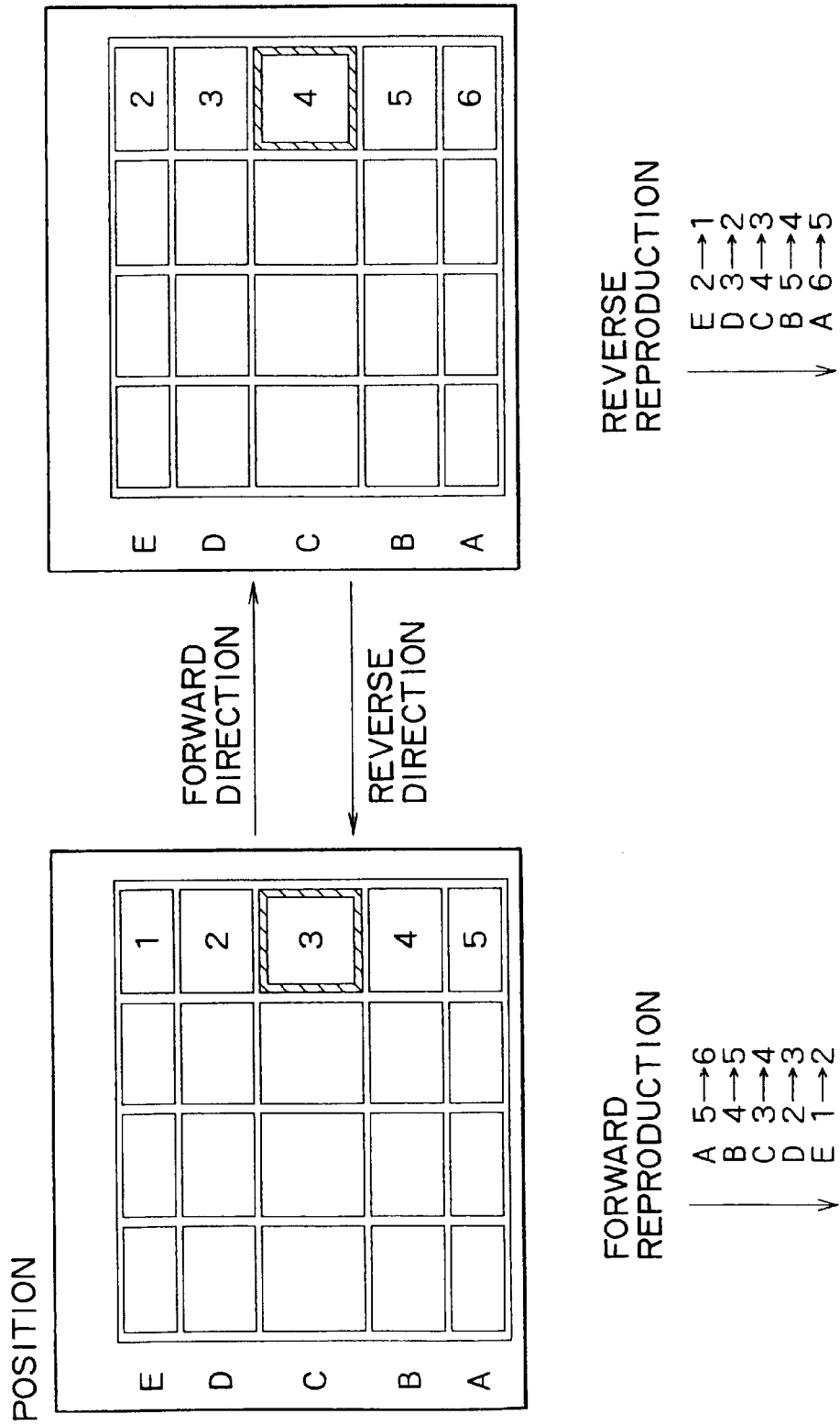
FIGS. 9A and 9B are schematic diagrams illustrating how a cross fading operation is performed.

In an example where the small screens of respective channels constituting the index picture are termed A, B, C, D, E in this order from below as shown in FIGS. 9A and 9B, the small screen C is a main one, and the small screens A, B, D, E are subsidiary ones.

Suppose now that, as shown in FIG. 9A, video images of frame numbers 5, 4, 3, 2, 1 are displayed on the small screens A, B, C, D, E respectively. In a forward reproduction mode, the images displayed on the small screens are switched, in the next stage, to those shown in FIG. 9B. In this case, for example, the video data of frame number 5 is supplied to the frame buffer A, while the video data of frame number 6 is supplied to the frame buffer B. And then the video data of frame number 5 and the video data of frame number 6 are added at the predetermined rate as mentioned, so that the added video data are supplied to the output image buffer 40, whereby the corresponding image is displayed on the small screen A. And finally the image of frame number 6 is displayed on the small screen A while being cross faded. In this case, the cross fade factor generator 38 changes the value of its output coefficient a from 1 to 0.

Subsequently the video data of frame number 4 is supplied to the frame buffer B, while the video data of frame number 5 in the frame buffer A is kept intact. And then the video data of frame number 5 and the video data of frame number 4 are added at the predetermined rate in the same manner as mentioned, whereby the image corresponding to the added video data is displayed on the small screen B. And finally the image of frame number 5 is displayed on the small screen B while being cross faded. In this case, the cross fade factor generator 38 changes the value of its output coefficient a from 0 to 1.

Next the video data of frame number 3 is supplied to the frame buffer A, while the video data of frame number 4 in the frame buffer B is kept intact. And then the video data of frame number 4 and the video data of frame number 3 are added at the predetermined rate in the same manner as mentioned, whereby the image corresponding to the added video data is displayed on the small screen C. And finally the image of frame number 4 is displayed on the small screen C while being cross faded.

Thereafter the video data of frame number 2 is supplied to the frame buffer B, while the video data of frame number 3 in the frame buffer A is kept intact. And then the video data of frame number 3 and the video data of frame number 2 are added at the predetermined rate in the same manner as mentioned, whereby the image corresponding to the added video data is displayed on the small screen D. And finally the image of frame number 3 is displayed on the small screen D while being cross faded.

Next the video data of frame number 1 is supplied to the frame buffer A, while the video data of frame number 2 in the frame buffer B is kept intact. And then the video data of frame number 2 and the video data of frame number 1 are added at the predetermined rate in the same manner as mentioned, whereby the image corresponding to the added video data is displayed on the small screen E. And finally the image of frame number 2 is displayed on the small screen E while being cross faded.

In the reverse reproduction mode, the images displayed on the small screens are altered to the next images while being cross faded successively in an order reverse to the forward reproduction, i.e., from E to A. In this example, first the image of frame number 2 displayed on the small screen E is altered to the image of frame number 1, and next the image of frame number 3 displayed on the small screen D is altered to the image of frame number 2. Subsequently the image of frame number 4 displayed on the small screen C is altered to the image of frame number 3, and thereafter the image of frame number 5 displayed on the small screen B is altered to the image of frame number 4. And finally the image of frame number 6 displayed on the small screen A is altered to the image of frame number 5.

In the manner described above, the images displayed on the small screens respectively are altered, while being cross faded, to the images of the frames to be displayed next.

Figure 10:
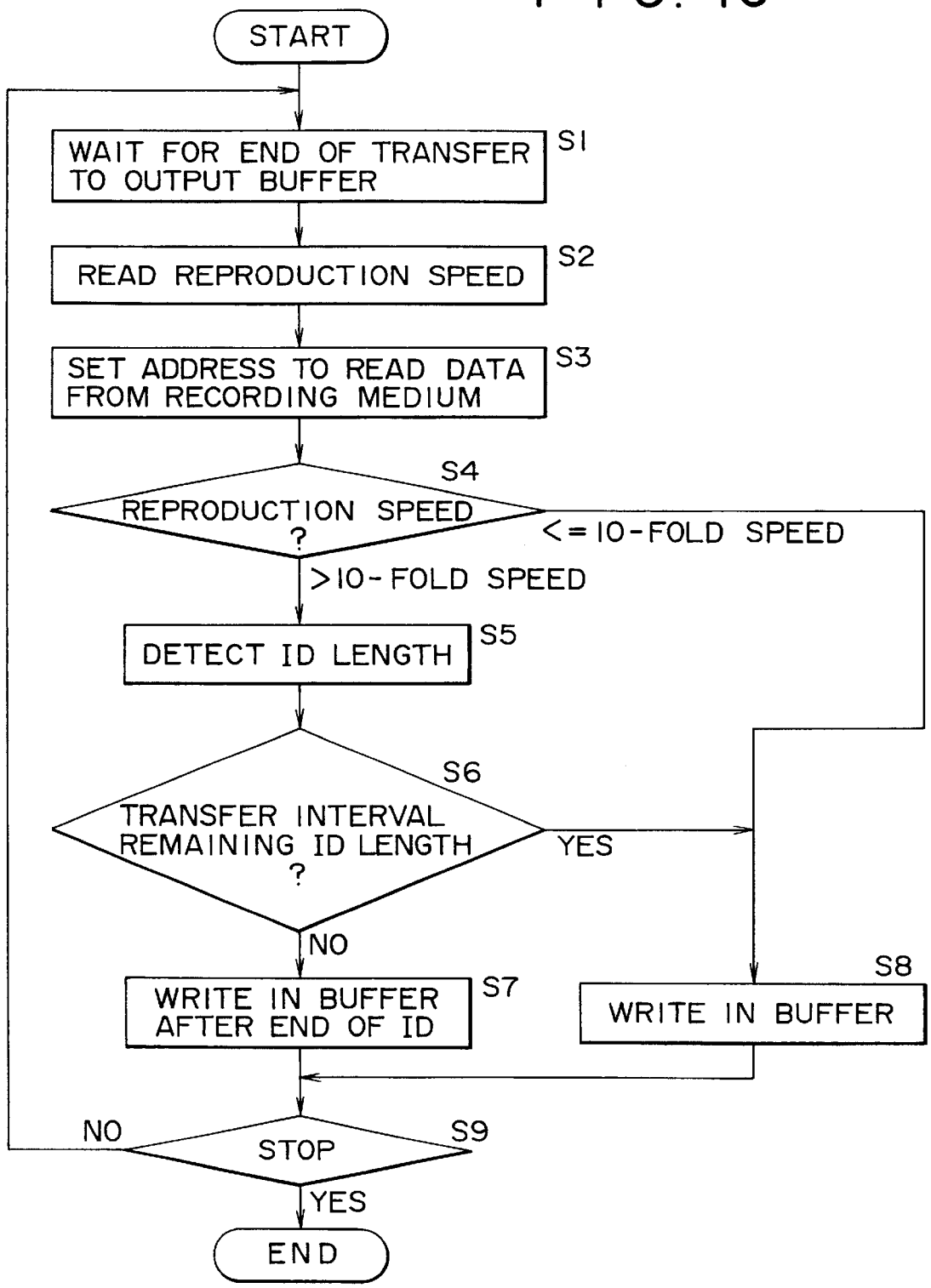
FIG. 10 is a flowchart for explaining a routine of writing data in an output image buffer.
Figure 11:
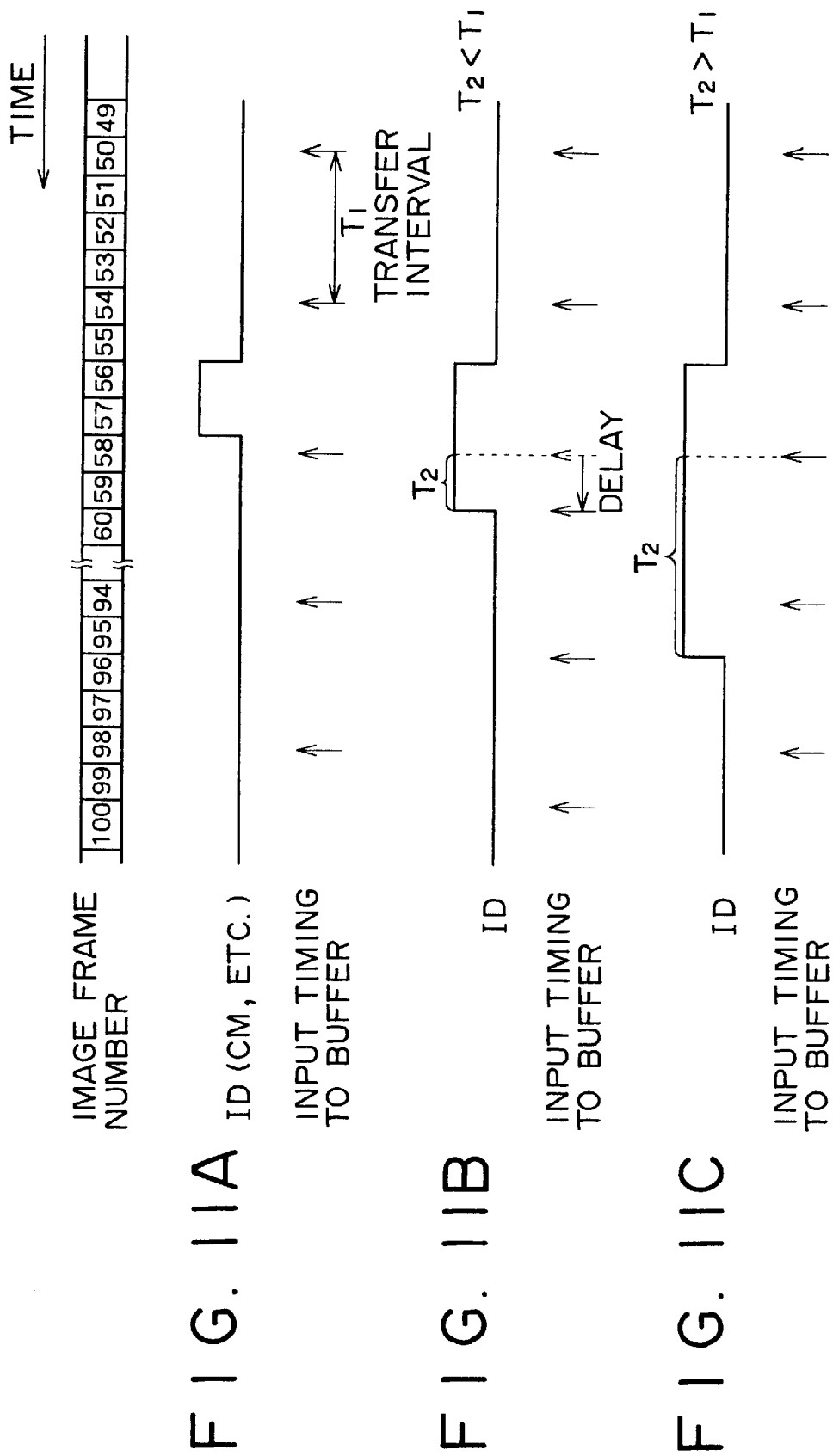
FIGS. 11A, 11B and 11C are timing charts of signals for explaining a processing method which conforms with the length of a CM and a reproduction speed.

Now a method of processing a commercial (CM) in an index reproduction mode will be explained below with reference to a flowchart of FIG. 10 and a timing chart of FIG. 11.

First at step S1, the system controller 1 executes a process to wait for the end of transferring, to the output image buffer 40, the image of one small screen constituting the index picture. Subsequently at step S2, the user manipulates the reproduction control signal input unit 2 to thereby enable the system controller 1 to load the input reproduction speed.

At step S3, the address of the video data to be read out from the recording medium 5 is set by the system controller 1. Next, in case a reproduction-speed threshold value predetermined for deciding a CM skip is a 10-fold speed, a decision is made at step S4 as to whether the input reproduction speed is higher than a 10-fold speed or not. And if the result of this decision signifies that the input reproduction speed is higher than a 10-fold speed, the operation proceeds to step S5, where the commercial length (number of frames, etc.) is detected by reading out the recorded ID from the recording medium 5.

Thereafter at step S6, a transfer interval corresponding to the reproduction speed (in this example, the read frame interval represented by the number of frames) is compared with the remaining ID length (represented by the number of frames, etc.). And if the result of this comparison signifies that the transfer interval is greater than or equal to the number of the remaining frames, the operation proceeds to step S7. After termination of reading the frames where the CM classified by the video kind of the ID is described, ordinary frames unrelated to the CM are read out and then are written in the output image buffer 40. Thus, any frame corresponding to the CM is not written in the output image buffer 40, so that it becomes possible not to display the CM.

Meanwhile, if the result of the decision at step S4 signifies that the reproduction speed is lower than or equal to a 10-fold speed, the operation proceeds to step S8, where the video data read out from the recording medium 5 are written in the output image buffer 40 regardless of the video kind including the CM. The reason is based on that, if the process is so executed as not to display the CM at any reproduction speed lower than a 10-fold speed, the images are rendered discontinuous at the CM to be consequently unsatisfactory in appearance.

Upon termination of the processes at steps S7 and S8, the operation proceeds to step S9, where a decision is made as to whether an end of the routine has been instructed through manipulation of the reproduction control signal input unit 2 by the user, or whether such instruction has been given from the system controller 1 after complete reproduction of the entire recorded video data from the recording medium 5. And in case the result of the above decision signifies that an end of the routine has been instructed from the system controller 1, this routine is brought to an end. Meanwhile, if the result of the decision signifies that an end of the routine is not instructed by the system controller 1, the operation returns to step S1 and then executes the processes subsequent thereto.

In an example of FIG. 11A where the CM length is smaller than the transfer interval and there exists no frame corresponding to the CM at the timing of transfer, the CM is not reproduced even without execution of any particular process. In the case of this example, two frames Nos. 56 and 57 constitute the CM, and data to identify the CM classified by the video kind of the corresponding ID are described therein.

In a next example of FIG. 11B where some (frames Nos. 58 and 59) of frames (Nos. 56 to 59) constituting the CM are existent after the timing of transfer, the remaining CM length T2, which extends from the timing of transfer to the final frame (No. 59) of the CM (i.e., the length corresponding to two frames Nos. 58 and 59 in this example), is smaller than the transfer interval Ti (corresponding to four frames in this example), so that the timing of transfer is delayed by a period of two frames.

And in another example of FIG. 11C where some (frames Nos. 58 to 95) of frames (Nos. 56 to 95) constituting the CM are existent after the timing of transfer, the remaining CM length T2, which extends from the timing of transfer to the final frame (No. 95) of the CM (i.e., the length corresponding to 38 frames Nos. 58 to 95 in this example), is greater than the transfer interval (corresponding to four frames in this example), so that the frames constituting the CM are also transferred to the output image buffer 40 while the timing of transfer is kept intact, whereby the images are rendered continuous.

Thus, at the time of retrieval, images of a plurality of input channels are displayed simultaneously on an index picture, and the image of each input channel can be displayed together with the time-serially anterior and posterior images. And in a fast reproduction mode, any image unrelated to a CM or the like is not displayed so that a user can search for a desired image with facility while viewing the anterior and posterior images with fast reproduction. Further, the user's eye strain can be suppressed since the images are altered with cross fade to the next images respectively.

Figure 12:
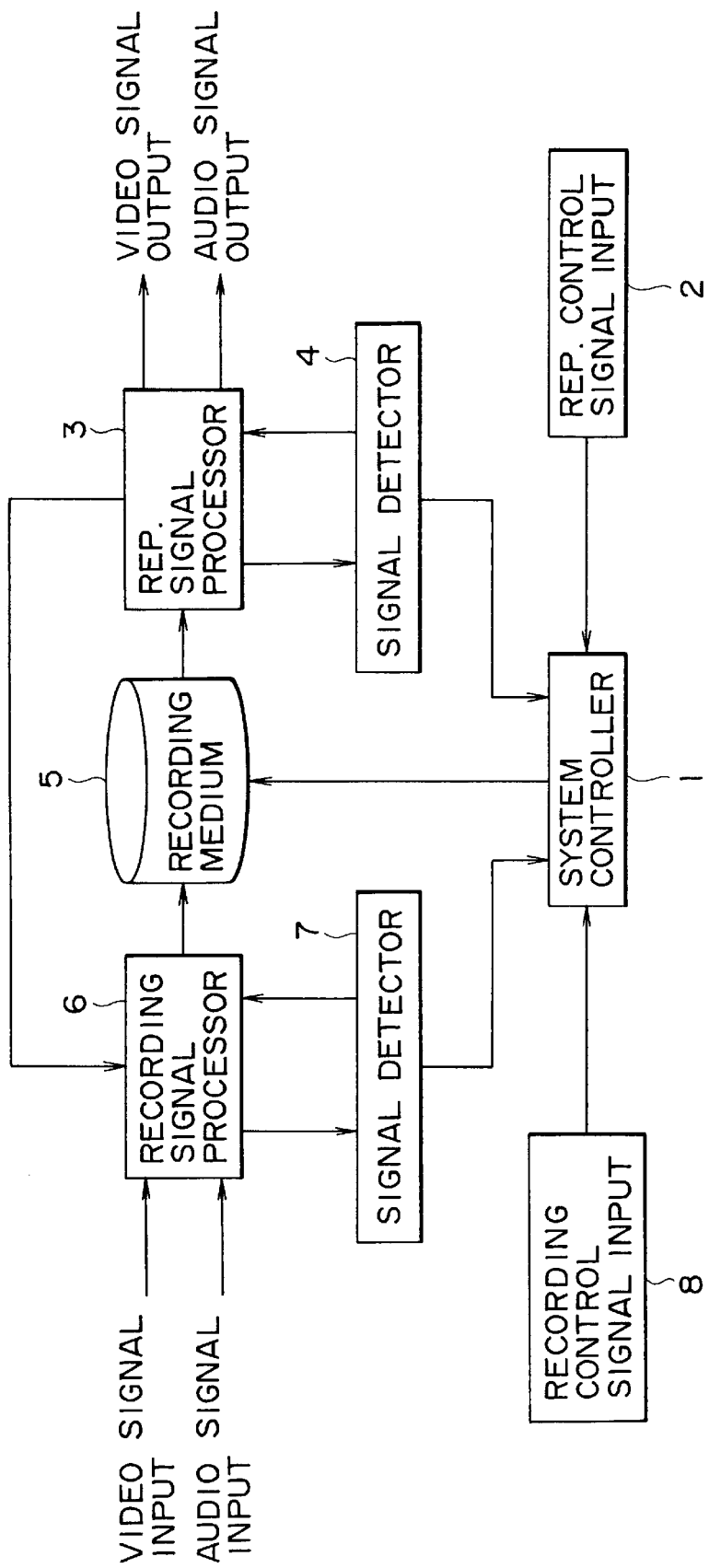
FIG. 12 is a block diagram of another exemplary embodiment of a video-audio recording/reproducing apparatus where the recording/reproducing apparatus of the present invention is applied.

FIG. 12 is a block diagram of another embodiment representing a video-audio recording/reproducing apparatus where the recording/reproducing apparatus of the present invention is applied. In the embodiment of FIG. 12, a recording section is incorporated in addition to the structure of the aforementioned embodiment shown in FIG. 1. More specifically, the incidental recording section comprises a recording signal processor 6, a signal detector 7 and a recording control signal input unit 8.

The recording signal processor 6 converts input video signal and audio signal into digital video data and audio data respectively, and then executes compression of such data. The signal detector 7 detects a feature of the video data and outputs information representing such feature. For example, the detector 7 serves to detect a commercial (CM) or the like. Further the recording signal processor 6 records, in a recording medium 5, the output data from the signal detector 7 as incidental data (ID) together with the video and audio data corresponding thereto.

The recording control signal input unit 8 consists of a keyboard, a mouse or the like and supplies a recording control signal, which is obtained through manipulation of the key or the mouse by a user, to a system controller 1.

The other structure and operation are basically the same as those described above with reference to FIG. 1, and a repeated explanation thereof is omitted here. In this embodiment, the recording signal processor 6, the signal detector 7, the recording control signal input unit 8, the system controller 1 and the recording medium 5 constitute a recording section; while the system controller 1, a reproduction control signal input unit 2, a reproduced signal processor 3, a signal detector 4 and the recording medium 5 constitute a reproducing section.

Figure 13A:
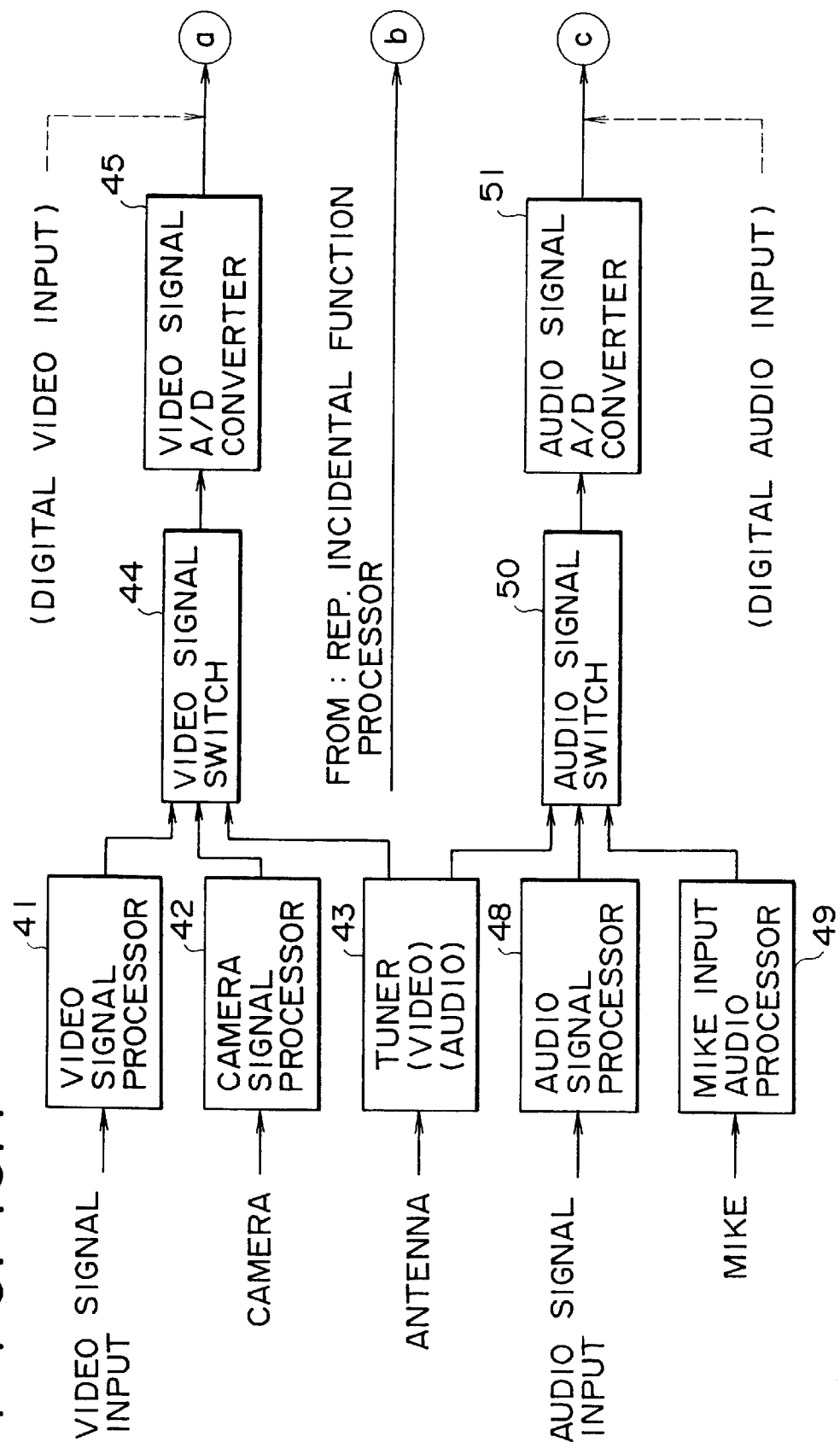
FIG. 13 is a block diagram showing a structural example of the recording section in FIG. 12.

FIG. 13 is a block diagram showing a detailed structural example of the recording section in FIG. 12. A video signal processor 41 restores a video signal, which is inputted from a VTR or the like, to a former baseband signal and then outputs the same. A camera signal processor 42 restores an input video signal from a video camera or the like to a former baseband signal and then outputs the same. A tuner 43 selects a desired broadcasting station out of input signals received via an antenna, then restores the video and audio signals of the selected broadcasting station to former baseband signals, and outputs the same.

A video signal switch 44 selectively switches, under control of the system controller 1, the signals supplied from the video signal processor 41, the camera signal processor 42 and the tuner 43. A video signal A/D converter 45 converts the video signal, which is inputted thereto from the video signal switch 44, into digital video data. A video signal detection controller 46 extracts a feature of the video data and outputs incidental data (ID) representing such feature inclusively. A video signal band compressor 47 compresses the input video data according to the MPEG (Moving Picture Experts Group) standard or the like and then outputs the compressed video data.

An audio signal processor 48 restores an audio signal, which is inputted from the VTR or the like, to a former baseband signal and then outputs the same. A mike input audio processor 49 restores an input audio signal from a mike (microphone) of the video camera or the like to a former baseband signal and then outputs the same. And an audio signal switch 50 selectively switches, under control of the system controller 1, the audio signals supplied thereto from the tuner 43, the audio signal processor 48 and the mike input audio processor 49.

An audio signal A/D converter 51 converts the input audio signal into digital audio data and then output the same. An audio signal detection controller 52 executes a process of noise component elimination and so forth with regard to the input audio data and then outputs the processed audio data. An audio signal band compressor 53 compresses the input audio data and then outputs the compressed data.

A recording data processor 54 superimposes the video data supplied from the video signal band compressor 47, the audio data from the audio signal band compressor and the incidental data from the video signal detection controller 46, and then outputs the resultant signal.

Now an explanation will be given on the operation performed when recording the input video and audio signals while simultaneously detecting a feature of the video signal and recording it as ID of the format described above with reference to FIG. 3.

The video signal inputted from a VTR or the like to the video signal processor 41 is first restored to the former baseband signal and then is supplied to the video signal switch 44. Meanwhile the video signal supplied to the camera signal processor 42 is first returned to the former baseband signal and then is supplied to the video signal switch 44. The signal of a desired broadcasting station is selected out of the entire signals inputted to the tuner 43 via the antenna and, after being restored to the baseband signal, the video signal is supplied to the video signal switch 44 while the audio signal is supplied to the audio signal switch 50.

The audio signal inputted from a VTR or the like to the audio signal processor 48 is first restored to the baseband signal and then is supplied to the audio signal switch 50. Meanwhile the audio signal inputted from a mike of a video camera or the like is first restored to the baseband signal by the mike input audio processor 49 and then is supplied to the audio signal switch 50.

One of the video signals supplied from the video signal processor 41, the camera signal processor 42 and the tuner 43 to the video signal switch 44 is selectively switched and outputted under control of the system controller 1. Subsequently the video signal outputted from the video signal switch 44 is converted by the video signal A/D converter 45 into digital video data, which is supplied therefrom to the video signal detection controller 46.

In the video signal detection controller 46, a feature of the video signal is detected. And incidental data representing such feature is supplied to the recording data processor 54. Meanwhile the video data is supplied also to the video signal band compressor 47. The video data thus supplied to the video signal band compressor 47 is compressed according to the MPEG standard or the like. and then is supplied to the recording data processor 54.

One of the audio signals supplied to the audio signal switch 50 from the tuner 43, the audio signal processor 48 and the mike input audio processor 49 is selectively switched and outputted under control of the system controller 1 and then is supplied to the audio signal A/D converter 51. Subsequently the audio signal thus supplied to the audio signal A/D converter 51 is converted into digital audio data and then is supplied to the audio signal detection controller 52. After a process of noise component elimination and so forth are executed in the audio signal detection controller 52, the processed signal is supplied to the audio signal band compressor 53. The audio data thus supplied to the audio signal band compressor 53 is compressed according to the MPEG standard or the like and then is supplied to the recording data processor 54.

The video data, the incidental data and the audio data supplied to the recording data processor 54 from the video signal band compressor 47, the video signal detection controller 46 and the audio signal band compressor 53, respectively, are superimposed and supplied to the recording medium 5, where the supplied data are recorded in a predetermined format as described with reference to FIG. 4. Meanwhile the incidental data is recorded as ID of the aforementioned format of FIG. 3 in relation to the corresponding video and audio data.

In the manner mentioned above, features of the input video and audio signals are detected, and the ID (incidental data) inclusive of the information representing such features is recorded in relation to the video and audio signals.

Figure 14B:
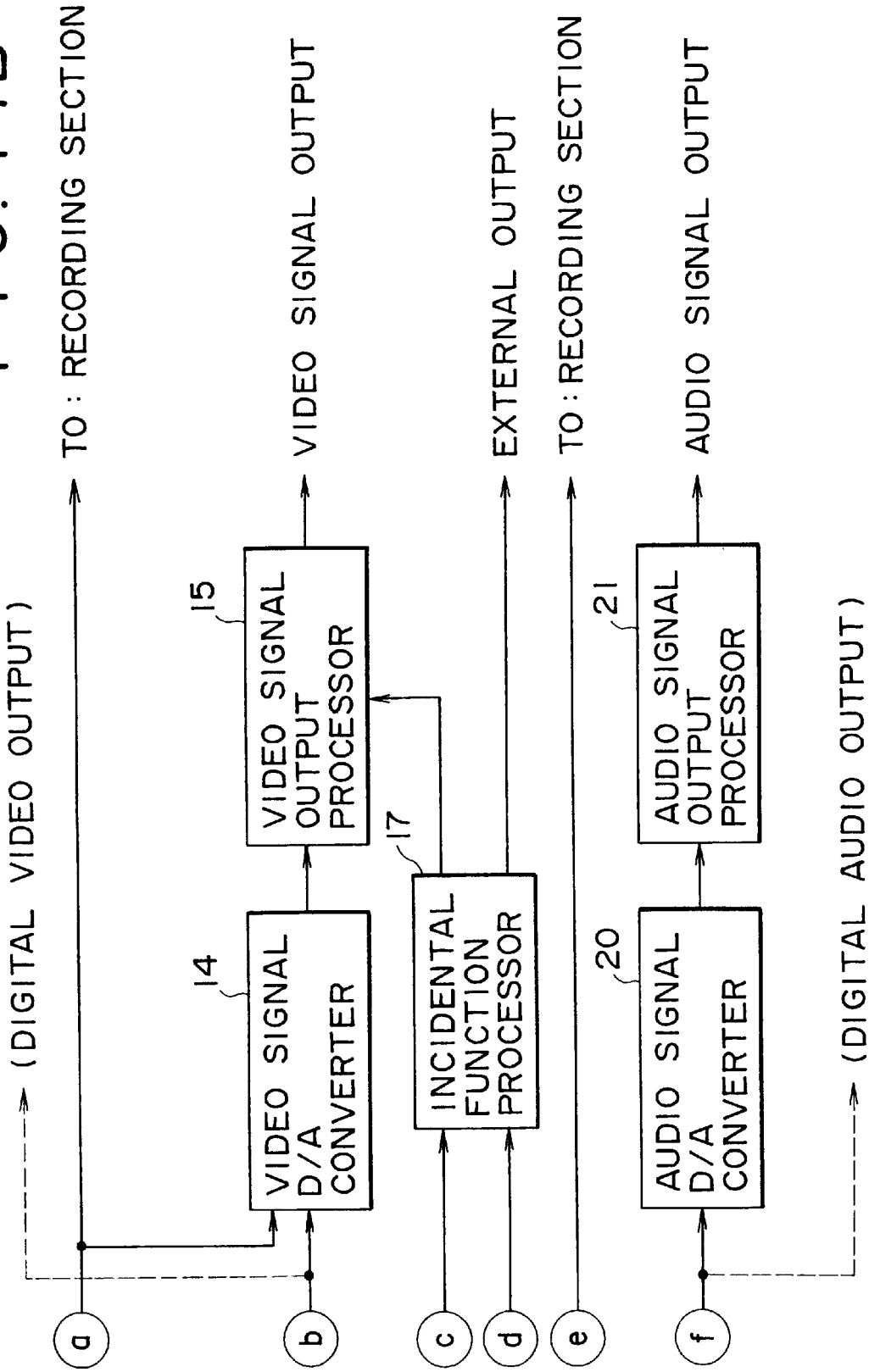
FIG. 14 is a block diagram showing a structural example of the reproducing section in FIG. 12.

FIG. 14 is a block diagram showing a structural example of the reproducing section in the video-audio recording/reproducing apparatus of FIG. 1. The structure of FIG. 14 is constituted by additionally incorporating a recording control signal input unit 8 in the structure of FIG. 2, wherein the output of the index picture forming processor 16 and the output of the video signal detection controller 13 are supplied to the recording section.

Therefore, as will be described later, video data displayed on the small screens to constitute an index picture can be recorded in the recording medium 5. And whenever necessary, the video data on the small screens for the index picture recorded in the recording medium 5 can be read and displayed on the small screens to constitute the index picture.

An index picture forming processor 16 in the embodiment of FIG. 14 has a plurality of frame buffers equal in number to the small screens constituting an index picture, as will be described later with reference to FIG. 15. And a video signal detection controller 13 detects a feature of input video data and then outputs information representing the detected feature.

Any other structure and operation are basically the same as those of the reproducing section shown in FIG. 2, so that a repeated explanation thereof is omitted here.

Figure 15:
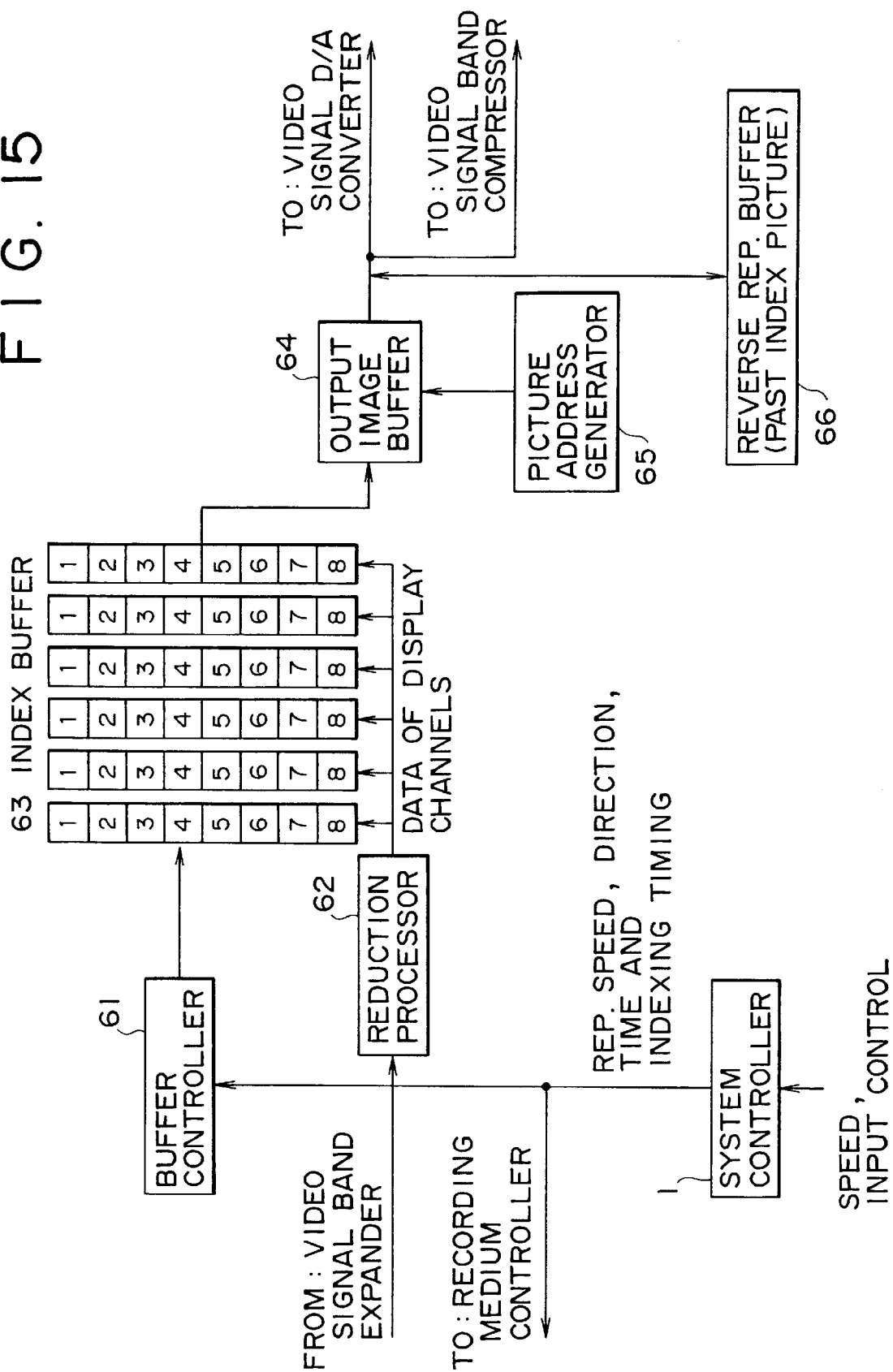
FIG. 15 is a block diagram showing a structural example of an index picture forming processor.

FIG. 15 is a block diagram showing a structural example of the index picture forming processor 16 in FIG. 14. A buffer controller 61 serves to control input and output of an index buffer 63 (storage means) under control of a system controller 1. More specifically, control data including a reproduction speed, a reproduction direction, a reproduction time, indexing timing and so forth are supplied from the system controller 1, and the buffer controller 61 controls the index buffer 63 in accordance with such control data. A reduction processor 62 reduction means) reduces the video data, which are supplied from a video signal band expander 12, to adequate dimensions displayable on the small screens constituting an index picture, and then supplies the reduced video data to the index buffer 63.

As will be described later with reference to FIG. 17, a plurality of small screens corresponding to a plurality of channels are displayed to constitute an index picture. For this purpose, the index buffer 63 has a plurality of frame buffers corresponding to such small screens for the index picture. In this embodiment, eight frame buffers are provided for each of five channels.

In response to a control signal from the system controller 1, a picture address generator 65 supplies, to an output image buffer 64 (display control means), addresses where the input video data are to be written. In the output image buffer 64, the video data supplied thereto from the index buffer 63 correspondingly to the respective small screens to constitute the index picture are stored in predetermined areas in accordance with the addresses supplied from the picture address generator 65.

A reverse reproduction buffer 66 (save means) stores the video data corresponding to the past index picture, and outputs the video data at predetermined timing in response to a control signal from the system controller 1.

Figure 16:
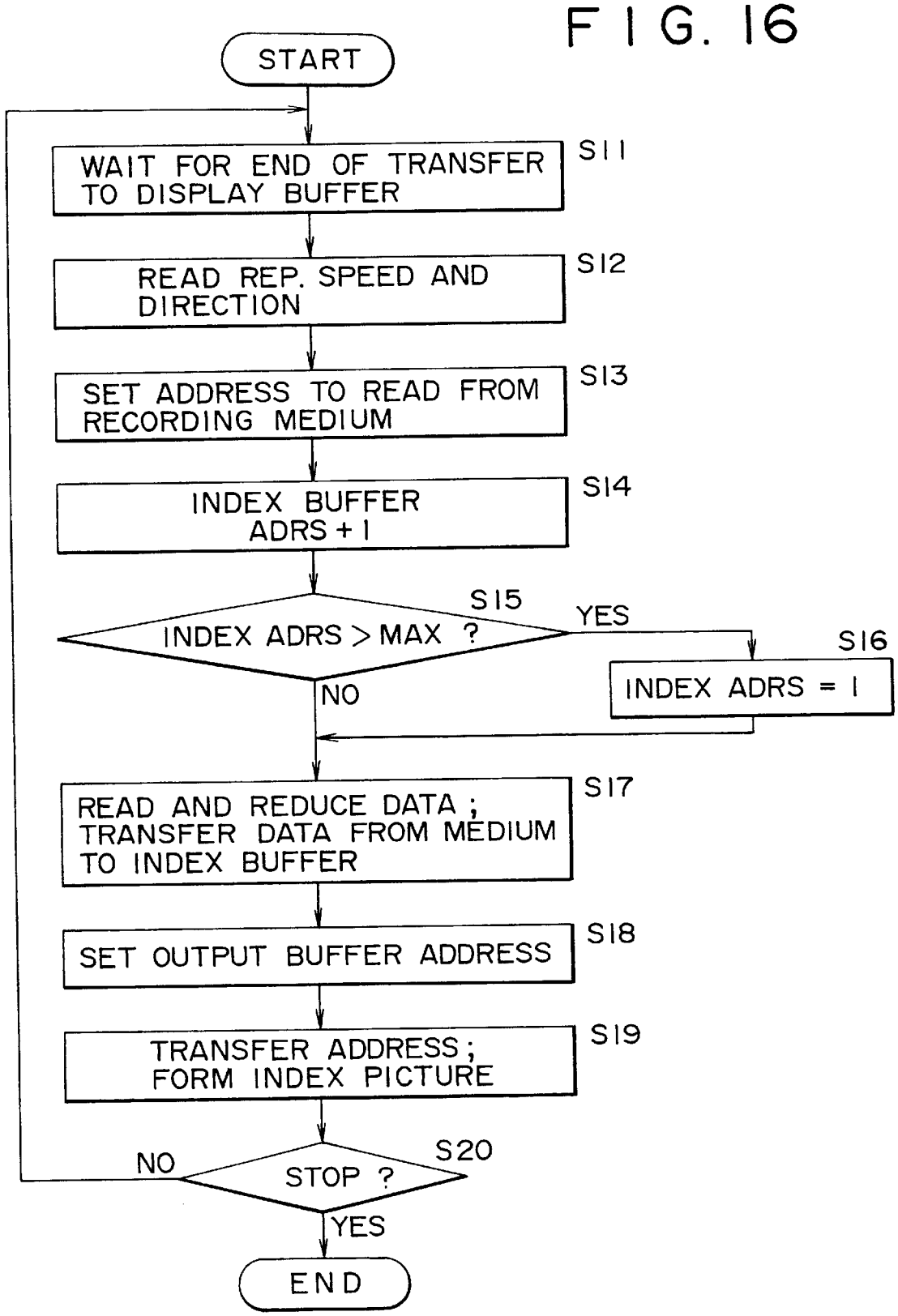
FIG. 16 is a flowchart for explaining a routine of forming an index picture.

Hereinafter an explanation will be given on a routine to form an index picture with reference to a flowchart of FIG. 16. First at step S11, the system controller 1 executes a process to wait for the end of transferring, to the output image buffer 64, the image of one small screen constituting the index picture. Subsequently at step S12, the user manipulates the reproduction control signal input unit 2 to thereby enable the system controller 1 to load the input reproduction speed.

At step S13, the address of the video data to be read out from the recording medium 5 is set by the system controller 1 in conformity with the reproduction speed. Next at step S14, the index address (INDEX ADRS) (1 to 8 in this example) representing the relevant frame buffer in the index buffer 63 is incremented by 1. Thereafter at step S15, a decision is made as to whether the index address value is greater than the frame buffer number (MAX: 8 in this example). And if the result of this decision signifies that the index address value is greater than the frame buffer number, the operation proceeds to step S16, where the index address value is set to 1.

The operation proceeds to step S17 in case the result of the decision at step S15 signifies that the index address value is smaller than or equal to the frame buffer number or after termination of the process at step S16. And at step S17, the video data are read out by the reproduced data processor 11 from the address of the recording medium 5 set at step S13. The video data thus read out are expanded by the video signal band expander 12 and then are supplied to the reduction processor 62 which constitutes the index picture forming processor 16.

The video data supplied to the reduction processor 62 are reduced therein and then are supplied to the index buffer 63. The buffer controller 61 controls the index buffer 63 in accordance with the control information (including reproduction speed, reproduction direction, reproduction time, indexing timing, etc.) supplied from the system controller 1. And the video data supplied from the reduction processor 62 to the index buffer 63 are supplied to the frame buffer relevant to the input (display) channel corresponding to the supplied video data.

In the frame buffers of the index buffer 63 where the video data not used (not necessary) any longer in the output image buffer 64 are stored, there are written the video data read out from the recording medium 5, expanded in the video signal band expander 12 and reduced in the reduction processor 62 under control of the system controller 1.

Figure 17:
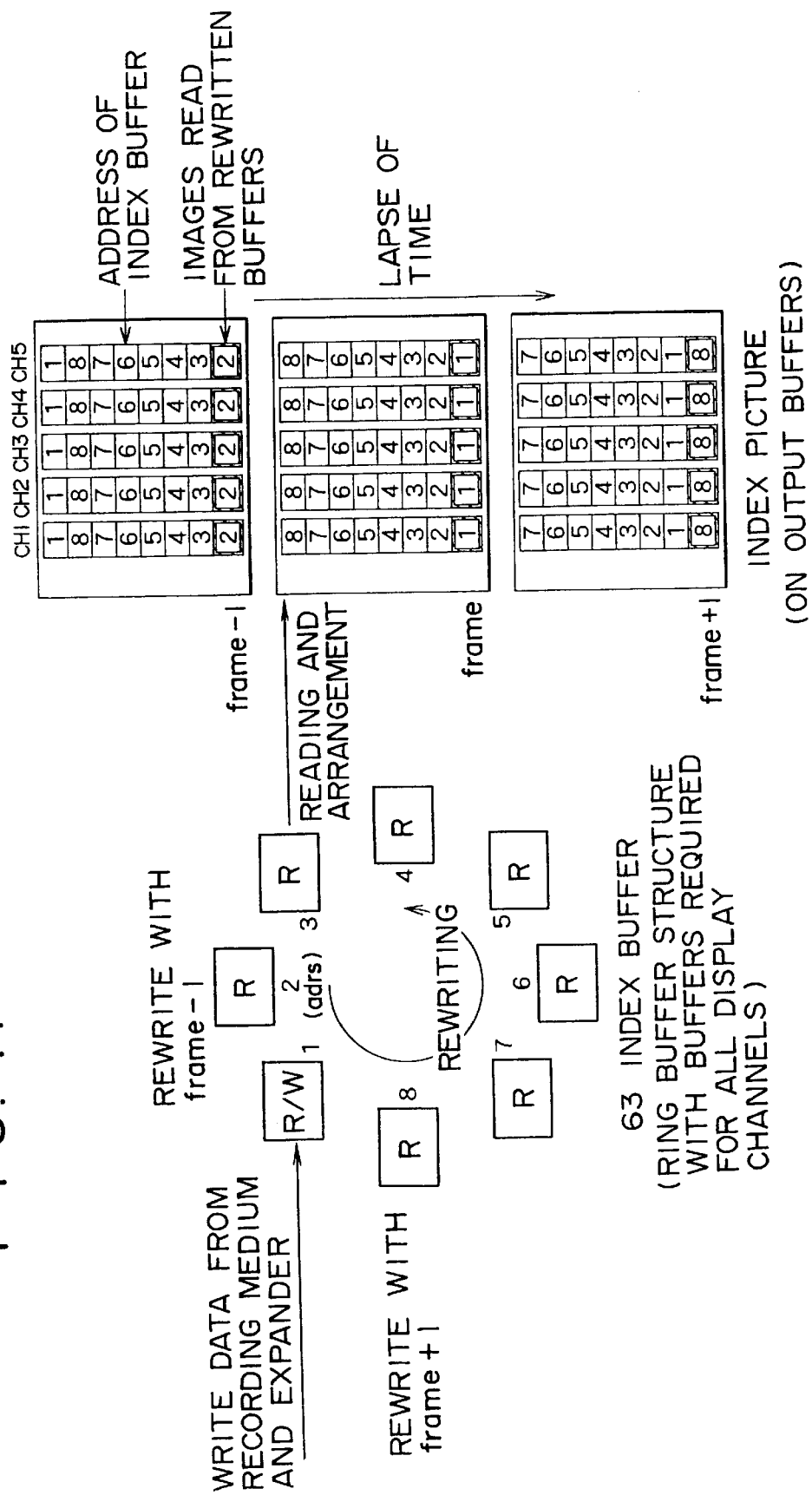
FIG. 17 is a diagram for explaining operations of writing and reading data in an index buffer.

More specifically, eight frame buffers of each display channel constituting the index buffer 63 are ring buffers disposed in the shape of a ring virtually as shown in FIG. 17, and the video data supplied from the video signal band expander 12 are recorded successively therein with shift one by one. And the frame buffers are so arranged as to correspond to the index picture.

That is, as shown in FIG. 17, the frame buffers of the index buffer 63 are so disposed as to correspond respectively to the small screens which constitute the index picture. And with a lapse of time, the relationship of such correspondence is shifted one by one. Suppose now that, for example, the video data stored respectively in the frame buffers of the index buffer 63 correspond respectively to the frame buffers Nos. 2, 3, . . . , 8, 1 in this order from the lowermost of the index picture.

In this case, when the displayed images are switched to next ones, the content of the frame buffer No. 1 is replaced with the video data read out from the recording medium 5 to be displayed next. Subsequently the relationship of correspondence between the frame buffers and the small screens for the index picture is shifted upward one by one. As a result, the frame buffers Nos. 1, 2, . . . , 8 in this order are so changed as to correspond respectively to the small screens for the index picture from the lowermost one.

Similarly to the above, when the displayed images are switched to next ones, the content of the frame buffer No. 8 adjacent to No. 1 is replaced with the video data read out from the recording medium 5 to be displayed next. Subsequently the relationship of correspondence between the frame buffers and the small screens for the index picture is shifted upward one by one. As a result, the frame buffers Nos. 8, 1, . . . , 7 in this order are so changed as to correspond respectively to the small screens for the index picture from the lowermost one.

Since the frame buffers equal in number to the small screens for the index picture are provided in this manner, the number of the frame buffers to be rewritten is decreasable merely to one at the time of switching the index picture to the next one, whereby the number of required accesses to the recording medium 5 can be curtailed, and further the frequency of expanding the images can be minimized to consequently realize efficient processing.

When a reverse reproduction mode is selected for example, the preceding index picture stored in the reverse reproduction buffer 66 is read out therefrom and then is displayed instantly. And thereafter the video data to be displayed next are read out from the recording medium 5. Thus, immediately after start of reverse reproduction, the video data stored in the reverse reproduction buffer 66 are displayed instantly so that the seeming response to the user can be enhanced.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

For example, in the above embodiments, the processing method is changed depending on whether the reproduction speed is higher than a 10-fold speed or not. However, the reference is not limited only to a 10-fold speed, and any other reproduction speed can also be set as the reference for changing the processing method.

Further, the number of small screens constituting an index picture and a layout thereof mentioned in the embodiments are mere examples.

The scope of the invention, therefore, is to be determined solely by the appended claims.

What is claimed is:

1. A recording/reproducing apparatus for recording and/or reproducing at least video data, comprising:

read means for reading out the video data;

designation means for selectively designating a reproduction speed;

control means for controlling, in accordance with the reproduction speed designated by said designation means, the interval at which said read means reads out the video data; and a plurality of storage buffers for storing reduced size image data generated by dimensionally reducing images included in said video data, said buffers respectively corresponding to a plurality of video data channels;

whereby images corresponding to at least two of said plurality of video data channels have been recorded at the same time, and respective reduced size image data corresponding to said at least two channels are simultaneously displayed.

2. The recording/reproducing apparatus according to claim 1, further comprising reduced display control means for executing, on a predetermined screen, simultaneous time-series display of reduced images obtained by dimensionally reducing the images which correspond to a predetermined number of video data read out by said read means.

3. A recording/reproducing apparatus for recording and/or reproducing at least video data, comprising:

read means for reading out the video data successively at a predetermined interval;

a plurality of storage buffers for storing reduced size image data generated by dimensionally reducing images included in said video data, said buffers respectively corresponding to a plurality of video data channels;

reduced display control means for executing, on a predetermined screen, simultaneous time-series display of reduced images obtained from said reduced size image data; and alteration means for gradually altering, in a forward reproduction mode, each reduced image to the time-serially posterior reduced image, or gradually altering, in a reverse reproduction mode, each reduced image to the time-serially anterior reduced image;

whereby images corresponding to at least two of said plurality of video data channels have been recorded at the same time, and respective reduced size image data corresponding to said at least two channels are simultaneously displayed.

4. A recording/reproducing apparatus for recording and/or reproducing at least video data, comprising:

designation means for selectively designating a reproduction speed;

first read means for successively reading out the video data at a predetermined read interval;

decision means for deciding, in accordance with the reproduction speed designated by said designation means, the interval at which said first read means reads out the video data;

second read means for reading out incidental data indicative of the kind of the video data;

change means for changing the video-data reading interval of said first read means on the basis of the incidental data read out by said second read means and the reading interval corresponding to the reproduction speed decided by said decision means; and a plurality of storage buffers for storing reduced size image data generated by dimensionally reducing images included in said video data, said buffers respectively corresponding to a plurality of video data channels;

whereby images corresponding to at least two of said plurality of video data channels have been recorded at the same time, and respective reduced size image data corresponding to said at least two channels are simultaneously displayed.

5. A recording/reproducing apparatus according to claim 4, wherein, when the video data of a predetermined kind are continuous for a predetermined period of time, the video data are read out at the interval decided by said decision means.

6. A recording/reproducing apparatus for recording and/or reproducing video data of a plurality of channels in or from a recording medium, comprising:

read means for reading out, at a predetermined interval, the video data recorded in a recording medium;

reduction means for dimensionally reducing images corresponding to the video data read out by said read means;

display control means for displaying the reduced images, which are obtained from said reduction means, on a plurality of small screens set on a predetermined screen; and a plurality of storage buffers for storing reduced size image data defining said reduced images, said buffers respectively corresponding to a plurality of video data channels;

wherein, when the data corresponding to the next reduced images to be displayed on the relevant small screens are stored in said buffers, said display control means displays the reduced images, which correspond to the data stored in said buffers and are to be displayed next, on the relevant small screens respectively;

whereby images corresponding to at least two of said plurality of video data channels have been recorded at the same time, and respective reduced size image data corresponding to said at least two channels are simultaneously displayed.

7. The recording/reproducing apparatus according to claim 6, wherein said storage buffers are ring buffers.

8. A recording/reproducing method for recording and/or reproducing at least video data, comprising the steps of:

reading out the video data;

designating a data reproduction speed selectively;

controlling the video data reading interval in accordance with the designated reproduction speed; and storing in a plurality of storage buffers reduced size image data generated by dimensionally reducing images included in said video data, said buffers respectively corresponding to a plurality of video data channels;

whereby images corresponding to at least two of said plurality of video data channels have been recorded at the same time, and respective reduced size image data corresponding to said at least two channels are simultaneously displayed.

9. A recording/reproducing method for recording and/or reproducing at least video data, comprising the steps of:

reading out the video data successively at a predetermined interval;

storing in a plurality of storage buffers reduced size image data generated by dimensionally reducing images included in said video data, said buffers respectively corresponding to a plurality of video data channels executing, on a predetermined screen, simultaneous time-series display of reduced images obtained from said reduced size image data; and gradually altering, in a forward reproduction mode, each reduced image to the time-serially posterior reduced image, or gradually altering, in a reverse reproduction mode, each reduced image to the time-serially anterior reduced image;

whereby images corresponding to at least two of said plurality of video data channels have been recorded at the same time, and respective reduced size image data corresponding to said at least two channels are simultaneously displayed.

10. A recording/reproducing method for recording and/or reproducing at least video data, comprising the steps of:

designating a reproduction speed selectively;

reading out the video data successively at a predetermined read interval;

deciding the video data reading interval in accordance with the designated reproduction speed;

reading out incidental data indicative of the kind of the video data; and changing the video data reading interval on the basis of the incidental data thus read out and the reading interval corresponding to the decided reproduction speed; and storing in a plurality of storage buffers reduced size image data generated by dimensionally reducing images included in said video data, said buffers respectively corresponding to a plurality of video data channels;

whereby images corresponding to at least two of said plurality of video data channels have been recorded at the same time, and respective reduced size image data corresponding to said at least two channels are simultaneously displayed.

11. A recording/reproducing method for recording and/or reproducing video data of a plurality of channels in or from a recording medium, comprising the steps of:

reading out, at a predetermined interval, the video data recorded in the recording medium;

dimensionally reducing the images corresponding to the video data thus read out;

displaying the reduced images on a plurality of small screens set on a predetermined screen;

storing in a plurality of storage buffers reduced size image data defining said reduced images, said buffers respectively corresponding to a plurality of video data channels; and when the data corresponding to the next reduced images to be displayed on the relevant small screens are stored, displaying the reduced images, which correspond to the stored data to be displayed next, on the relevant small screens respectively;

whereby images corresponding to at least two of said plurality of video data channels have been recorded at the same time, and respective reduced size image data corresponding to said at least two channels are simultaneously displayed.

* * * * *